(12) United States Patent
Goto et al.

(10) Patent No.: US 11,316,409 B2
(45) Date of Patent: Apr. 26, 2022

(54) MOTOR INCLUDING FLOW RECTIFICATION SECTION AND BULK REDUCTION SECTION

(71) Applicant: DENSO CORPORATION, Kariya (JP)

(72) Inventors: Ryosuke Goto, Kariya (JP); Hideaki Ishii, Kariya (JP)

(73) Assignee: DENSO CORPORATION, Kariya (JP)

( * ) Notice: Subject to any disclaimer, the term of this patent is extended or adjusted under 35 U.S.C. 154(b) by 231 days.

(21) Appl. No.: 16/633,874

(22) PCT Filed: Jun. 13, 2018

(86) PCT No.: PCT/JP2018/022623
§ 371 (c)(1),
(2) Date: Jan. 24, 2020

(87) PCT Pub. No.: WO2019/026433
PCT Pub. Date: Feb. 7, 2019

(65) Prior Publication Data
US 2020/0177058 A1     Jun. 4, 2020

(30) Foreign Application Priority Data

Jul. 31, 2017   (JP) .............................. JP2017-148506

(51) Int. Cl.
*H02K 9/22*     (2006.01)
*H02K 5/20*     (2006.01)
(Continued)

(52) U.S. Cl.
CPC ................. *H02K 9/22* (2013.01); *H02K 5/20* (2013.01); *H02K 9/06* (2013.01); *H02K 21/22* (2013.01)

(58) Field of Classification Search
CPC ........ H02K 1/187; H02K 1/2786; H02K 5/20; H02K 5/207; H02K 9/06; H02K 9/22;
(Continued)

(56) References Cited

U.S. PATENT DOCUMENTS

2001/0052733 A1    12/2001 Fujii et al.
2002/0084703 A1*   7/2002 Bunker ..................... H02K 1/20
                                                              310/64
(Continued)

FOREIGN PATENT DOCUMENTS

JP          11332200 A   * 11/1999
JP        2002112504 A   *  4/2002  ............. H02K 11/33
(Continued)

OTHER PUBLICATIONS

Sep. 4, 2018 Search Report issued in International Patent Application No. PCT/JP2018/022623.
(Continued)

*Primary Examiner* — Quyen P Leung
*Assistant Examiner* — Eric Johnson
(74) *Attorney, Agent, or Firm* — Oliff PLC

(57) ABSTRACT

A motor includes a holder having an annular plate shape with a plate thickness in an axial direction of a rotor housing, and including a flange section disposed so the rotor housing rotates at an inner side of the flange section, a center piece including a plate-shaped section opposing the flange section, and a heat sink including a heat dissipation section projecting from the plate-shaped section toward the flange section. The flange section integrates with a flow rectification section including a cooling air flow rectification face extending along a cooling air flow path between the flange section and the plate-shaped section. The heat dissipation section is disposed in the cooling air flow path. The cooling air flow rectification face closely opposes the top of the heat dissi- (Continued)

pation section. A bulk reduction section is between the cooling air flow rectification face and the flange section opposite of the plate-shaped section.

6 Claims, 16 Drawing Sheets

(51) Int. Cl.
*H02K 9/06* (2006.01)
*H02K 21/22* (2006.01)

(58) Field of Classification Search
CPC ........ H02K 9/227; H02K 21/22; H02K 11/30; H02K 11/33
See application file for complete search history.

(56) References Cited

U.S. PATENT DOCUMENTS

2017/0288507 A1* 10/2017 Otsuka ................. F04D 25/068
2018/0226857 A1* 8/2018 Ishizaki ................. H02K 5/161

FOREIGN PATENT DOCUMENTS

| JP | 2015-57014 | A |   | 3/2015 |
| JP | 2015057014 | A | * | 3/2015 |
| JP | 2017-184547 | A |   | 10/2017 |
| KR | 20000044144 | A | * | 7/2000 |

OTHER PUBLICATIONS

Apr. 30, 2021 Office Action issued in Chinese Patent Application No. 201880049462.9.

* cited by examiner

MOTOR INCLUDING FLOW RECTIFICATION SECTION AND BULK REDUCTION SECTION

TECHNICAL FIELD

The present disclosure relates to a motor.

BACKGROUND ART

Japanese Patent Application Laid-Open (JP-A) No. 2015-57014 discloses a motor including a stator, a rotor, a motor holder, a center piece, and a heat sink. In this motor, the rotor includes a roofed circular-tube-shaped rotor housing that houses the ring-shaped stator. The motor holder includes a flange section (circular disc section) formed in an annular plate shape with a plate thickness direction along an axial direction of the rotor housing. The rotor housing is disposed so as to be rotatable at an inner side of the flange section.

The center piece includes a plate-shaped section (main body) that opposes the flange section. A cooling air flow path (cooling air entry path) is formed extending along a radial direction of the flange section between the flange section and the plate-shaped section. The cooling air flow path includes a cooling air entry port at an outer peripheral side of the flange section and a cooling air discharge port at an inner peripheral side of the flange section. The heat sink includes a heat dissipation section projecting from the plate-shaped section toward the flange section, and the heat dissipation section is disposed in the cooling air flow path.

SUMMARY OF INVENTION

Technical Problem

In the above-described motor, if a large gap were present between a top of the heat dissipation section and the flange section, cooling air flowing along the cooling air flow path would only hit a top side portion of the heat dissipation section, which could lower the heat dissipation efficiency of the heat sink.

The present disclosure provides a motor capable of improving the heat dissipation efficiency of a heat sink.

Solution to Problem

A first aspect of the present disclosure is a motor including a ring-shaped stator, a rotor that includes a roofed circular-tube-shaped rotor housing configured to house the stator, a motor holder that is formed in an annular plate shape with a plate thickness direction along an axial direction of the rotor housing, the motor holder including a flange section disposed such that the rotor housing is rotatable at an inner side of the flange section, a center piece that includes a plate-shaped section opposing the flange section, and that is configured to support the motor holder and the stator, a cooling air flow path that is formed between the flange section and the plate-shaped section so as to extend along a radial direction of the flange section, and that includes a cooling air entry port at an outer peripheral side of the flange section and a cooling air discharge port at an inner peripheral side of the flange section, a heat sink that includes a heat dissipation section projecting from the plate-shaped section toward the flange section so as to be disposed in the cooling air flow path, a flow rectification section that includes a cooling air flow rectification face extending along the cooling air flow path so as to oppose a top of the heat dissipation section at a close distance, and that is integrally formed with the flange section, and a bulk reduction section that is formed between the cooling air flow rectification face and a face of the flange section at an opposite side from the plate-shaped section.

According to the first aspect described above, the flow rectification section, including the cooling air flow rectification face extending along the cooling air flow path, is integrally formed with the flange section, and the cooling air flow rectification face of the flow rectification section opposes the top of the heat dissipation section at a close distance. The position of a cooling airflow is redirected toward the heat dissipation section by the cooling air flow rectification face, enabling the rate of contact between the cooling air and the heat dissipation section to be increased.

Further, in the first aspect, the bulk reduction section is formed between the cooling air flow rectification face and the face of the flange section at the opposite side from the plate-shaped section. The volume of the flow rectification section is therefore reduced by an amount commensurate to the formation of the bulk reduction section, thereby enabling the occurrence of sink marks (shrinking deformation) on the flow rectification section to be suppressed when the motor holder, including the flow rectification section, is being molded. This enables the desired finished shape of the flow rectification section to be achieved.

The first aspect thus enables cooling air to be made to hit the heat dissipation section in an appropriate manner, thereby enabling efficient heat exchange between the cooling air and the heat dissipation section. This enables the heat dissipation efficiency of the heat sink to be improved.

A second aspect of the present disclosure is the motor of the first aspect, further including an upstand wall portion that projects perpendicularly from the flange section toward the plate-shaped section so as to form the cooling air discharge port between the upstand wall portion and the plate-shaped section.

According to the second aspect described above, the upstand wall portion projects perpendicularly from the flange section toward the plate-shaped section, and the cooling air discharge port is formed between the upstand wall portion and the plate-shaped section. Accordingly, the cooling air discharge port is positioned at the plate-shaped section side, and due to forming the upstand wall portion, the position of the cooling airflow heading toward the cooling air discharge port can be maintained on the plate-shaped section side while the cooling air flow is rectified by the flow rectification section. This enables the position of the cooling airflow to be suppressed from straying from the heat dissipation section, and enables the cooling air to be made to hit the heat dissipation section in a still more appropriate manner.

A third aspect of the present disclosure is the motor of the first aspect or the second aspect, wherein the flow rectification section protrudes from the flange section toward the heat dissipation section, and the bulk reduction section includes a groove that opens onto the cooling air flow rectification face and extends along the cooling air flow path.

According to the third aspect described above, the flow rectification section is configured so as to protrude from the flange section toward the plate-shaped section, thereby enabling the flow rectification section to be easily formed by molding.

Moreover, in the third aspect the bulk reduction section includes the grooves that open onto the cooling air flow rectification face, and the grooves extend along the cooling air flow path. This enables the cooling air to be guided along the length direction of the cooling air flow path, while the grooves also suppress the occurrence of sink marks in the flow rectification section. This enables the cooling air to flow smoothly along the cooling air flow path, thereby enabling heat exchange between the cooling air and the heat dissipation section to be promoted, and also enabling the heat dissipation efficiency of the heat sink to be still further improved.

A fourth aspect of the present disclosure is the motor of the first aspect or the second aspect, wherein the flow rectification section protrudes from the flange section toward the heat dissipation section, and the bulk reduction section includes a cavity formed in an inner portion of the flow rectification section.

According to the fourth aspect described above, the bulk reduction section includes the cavity formed in the inner portion of the flow rectification section. The bulk reduction amount of the flow rectification section is thereby secured by the cavity, enabling the volume of the flow rectification section to be even more effectively reduced, and thereby enabling the occurrence of sink marks in the flow rectification section to be still more effectively suppressed.

Moreover, in the fourth aspect, the flow rectification section internally formed with the cavity includes a pair of side wall portions on the two sides of a roof wall portion that includes the cooling air flow rectification face, thereby enabling the support rigidity of the roof wall portion that includes the cooling air flow rectification face to be increased.

A fifth aspect of the present disclosure is the motor of the first aspect or the second aspect, wherein the bulk reduction section includes a space that is formed between the flange section and the cooling air flow rectification face such that the flow rectification section is formed in a plate shape extending along the cooling air flow path.

According to the fifth aspect described above, the bulk reduction section includes the space formed between the flange section and the cooling air flow rectification face. The bulk reduction amount of the flow rectification section is thereby secured by the space, enabling the volume of the flow rectification section to be even more effectively reduced, and thereby enabling the occurrence of sink marks in the flow rectification section to be still more effectively suppressed.

Further, in the fifth aspect, due to this space, the flow rectification section is formed in a plate shape extending along the cooling air flow path, thereby enabling the structure of the flow rectification section to be simplified.

A sixth aspect of the present disclosure is the motor of any one of the first aspect to the fifth aspect, wherein the flange section is formed with plural dimples that are arrayed in a circumferential direction and in the radial direction of the flange section, and that each open onto the face of the flange section at the opposite side from the plate-shaped section, and of the plural dimples, the bulk reduction section includes a dimple formed at a position overlapping with the flow rectification section as viewed along a plate thickness direction of the flange section.

According to the sixth aspect described above, the plural dimples formed to the flange section are arrayed in the circumferential direction and the radial direction of the flange section, and each of the plural dimples opens onto the face of the flange section at the opposite side from the plate-shaped section. Thus, in cases in which, for example, a fan is fixed to the rotor and the fan opposes the flange section from the opposite side to the plate-shaped section, the plural dimples create a turbulent flow as the fan rotates, thereby enabling the generation of low frequency noise between the fan and the flange section to be suppressed.

Further, in the sixth aspect, out of the plural dimples, the bulk reduction section includes the dimple formed at a position overlapping with the flow rectification section as viewed along the plate thickness direction of the flange section. A portion of the plural dimples for suppressing low frequency noise is thereby utilized in the bulk reduction section in order to suppress sink marks in the flow rectification section, thereby enabling the structure of the flow rectification section to be simplified compared to cases in which a dedicated bulk reduction section is employed.

DESCRIPTION OF EMBODIMENTS

First Exemplary Embodiment

Explanation first follows regarding a first exemplary embodiment of the present disclosure.

Figure 1:
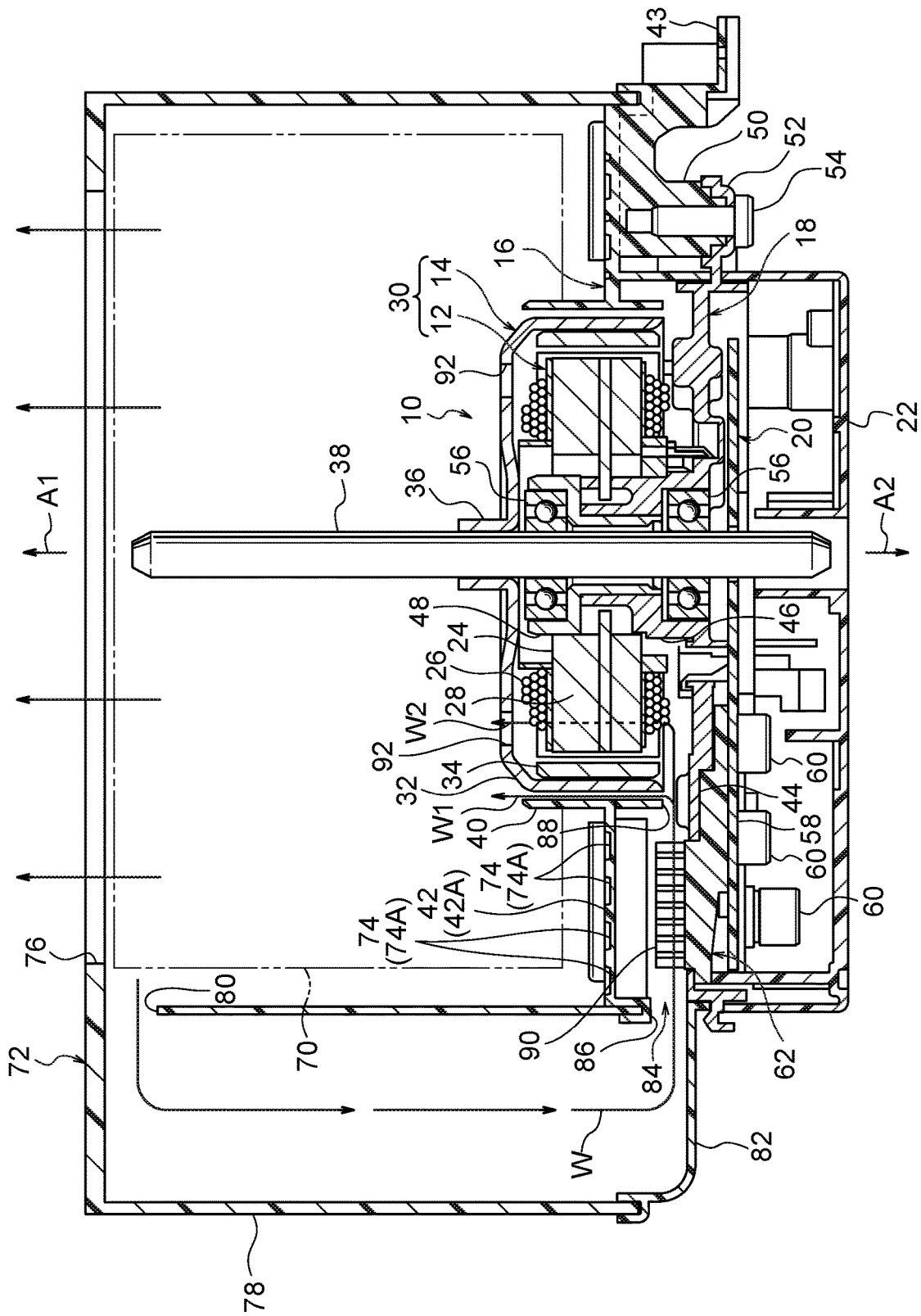
FIG. 1 is a vertical cross-section of a motor according to a first exemplary embodiment.

A motor 10 according to a first exemplary embodiment illustrated in FIG. 1 is for example suitably employed in an air blower device installed in a vehicle such as a passenger car. The motor 10 includes a stator 12, a rotor 14, a motor holder 16, a center piece 18, a control circuit 20, and circuit casing 22. Note that in each of the drawings, the arrow A1 indicates one axial direction side of the motor 10, and the arrow A2 indicates the other axia direction side of the motor 10.

The stator 12 includes a stator core 24 and plural windings 26. The plural windings 26 are wound about plural teeth 28 formed in a radiating pattern around the stator core 24, with resin insulators interposed between the windings 26 and the teeth 28. A hole that penetrates the stator core 24 in the axial direction is formed through a central portion of the stator core 24. The overall stator 12, including the stator core 24 and the plural windings 26, forms a ring shape.

Together, the stator 12 and the rotor 14 configure a motor body 30. The rotor 14 includes a roofed circular-tube-shaped rotor housing 32 and rotor magnets 34 attached to an inner side of a circumferential wall portion of the rotor housing 32. The rotor housing 32 houses the stator 12, and the rotor magnets 34 are disposed opposing the stator 12 from a radial direction outside of the stator 12.

A circular-tube-shaped fixed portion 36 is formed at a central portion of the roof of the rotor housing 32. A motor shaft 38 is press-fitted inside the fixed portion 36. A leading end portion of the motor shaft 38 projects out from the rotor housing 32 toward the one axial direction side.

The motor holder 16 is for example made of resin, and is provided around the periphery of the rotor housing 32. The motor holder 16 includes a circular tube portion 40 that surrounds the periphery of the rotor housing 32, and a flange section 42 that extends from the circular tube portion 40 toward a radial direction outside of the circular tube portion 40. The flange section 42 is formed in an annular plate shape with its plate thickness direction along the axial direction of the rotor housing 32. The rotor housing 32 is disposed at the inner side of the flange section 42 and the circular tube portion 40 so as to be rotatable. Plural attachment portions 43 that are fixed to an attachment target such as a vehicle body are also formed to the motor holder 16.

The center piece 18 includes a plate-shaped section 44 that opposes the flange section 42 in the axial direction of the motor 10, a support portion 46 that projects from a central portion of the plate-shaped section 44 toward the stator 12, and a support member 48 that is assembled to the support portion 46. Boss portions 50 that project toward the plate-shaped section 44 are formed at plural locations about a circumferential direction of the flange section 42. Join portions 52 are formed to the plate-shaped section 44 at positions corresponding to the boss portions 50. The motor holder 16 is assembled to and supported by the center piece 18 by joining the boss portions 50 and the join portions 52 together using bolts 54.

A leading end portion of the support portion 46 formed at the central portion of the plate-shaped section 44 is press-fitted inside the ring-shaped stator core 24. The stator 12 is thereby supported by the center piece 18. Shaft bearings 56 are respectively provided to the support portion 46 and the support member 48 provided to the center piece 18, and the motor shaft 38 is press-fitted inside the shaft bearings 56. The motor shaft 38 is supported by the support portion 46 and the support member 48 through the shaft bearings 56 in this manner, such that the entirety of the rotor 14 including the motor shaft 38 is rotatable with respect to the center piece 18 and the stator 12.

The control circuit 20 is disposed on the opposite side of the plate-shaped section 44 of the center piece 18 to the stator 12. The control circuit 20 includes a substrate 58 disposed following the plate-shaped section 44, plural mounted components 60 mounted on the substrate 58, and the like. The control circuit 20 has a function to control switching of excitation of the windings 26. The excitation of the windings 26 is switched under the control of the control circuit 20 to form a rotating magnetic field in the stator 12. By forming such a rotating magnetic field in the stator 12 the action of attracting and repelling forces between the stator 12 and the rotor 14 causes the rotor 14 to rotate.

A heat sink 62 is mounted to a face on the plate-shaped section 44 side of the substrate 58. Of the mounted components 60, mounted components 60 that generate heat, such as semiconductor elements, are thermally coupled to the heat sink 62.

The circuit casing 22 is formed in a flattened container shape, and is assembled to the plate-shaped section 44 in a state in which an opening in the circuit casing 22 faces toward the plate-shaped section 44. The control circuit 20 described above is housed in a space formed by the circuit casing 22 and the plate-shaped section 44.

As previously mentioned, the motor 10 is for example suitably employed in an air blower device installed in a vehicle such as a passenger car. In cases in which the motor 10 is utilized in an air blower device installed in a vehicle, the leading end portion of the motor shaft 38 is attached to a fan 70 (such as a sirocco fan), and the motor holder 16 is assembled to a duct 72 that houses the fan 70.

In a state in which the fan 70 has been attached to the leading end portion of the motor shaft 38, the fan 70 is disposed opposing the flange section 42 in the axial direction. Plural dimples 74 employed to reduce noise when the fan 70 rotates are formed in the flange section 42 (see FIG. 2 also). The plural dimples 74 open onto a face 42A of the flange section 42 at the opposite side from the plate-shaped section 44, namely, a face opposing the fan 70. The plural dimples 74 are formed around the entire circumference of the flange section 42, and are arrayed in the circumferential direction and radial directions of the flange section 42. Each of the plural dimples 74 opens toward the fan 70 side, namely, at the opposite side from the plate-shaped section 44.

The fan 70 is configured so as to blow air toward the one axial direction side of the fan 70 as it rotates. A blower outlet 76 is formed in the duct 72 at a position opposing the fan 70. A hollow cooling air intake section 78 is provided extending along an axial direction of the duct 72 at a side portion of the duct 72. A cooling air intake port 80 is formed at one end portion of the cooling air intake section 78. The inside of the cooling air intake section 78 and the inside of the duct 72 are placed in communication with each other through the cooling air intake port 80.

A cooling air entry section 82 through which the above-described cooling air enters the motor 10 is formed to the motor holder 16. The cooling air entry section 82 projects from one circumferential direction portion of the flange section 42 toward the radial direction outside of the flange section 42, and is connected to another end portion of the cooling air intake section 78. The cooling air entry section 82 is formed in a recessed shape that opens toward the one axial direction side of the motor holder 16, and the inside of the cooling air entry section 82 is in communication with the inside of the cooling air intake section 78.

The flange section 42 of the motor holder 16 and the plate-shaped section 44 of the center piece 18 oppose each other with a space therebetween. A cooling air flow path 84 is thereby formed extending along the radial direction of the flange section 42 between the flange section 42 and the plate-shaped section 44. The cooling air flow path 84 includes a cooling air entry port 86 at an outer peripheral side of the flange section 42, and a cooling air discharge port 88 at an inner peripheral side of the flange section 42.

The cooling air entry port 86 is in communication with the inside of the cooling air entry section 82, and the cooling air discharge port 88 is in communication with a gap between the circular tube portion 40 of the motor holder 16 and the rotor housing 32, and also with the inside of the rotor housing 32.

The heat sink 62 includes a heat dissipation section 90 configured by plural fins, plural pins, or the like. The heat dissipation section 90 passes through the plate-shaped section 44, projects out from the plate-shaped section 44 toward the flange section 42, and is disposed in the cooling air flow path 84.

Figure 2:
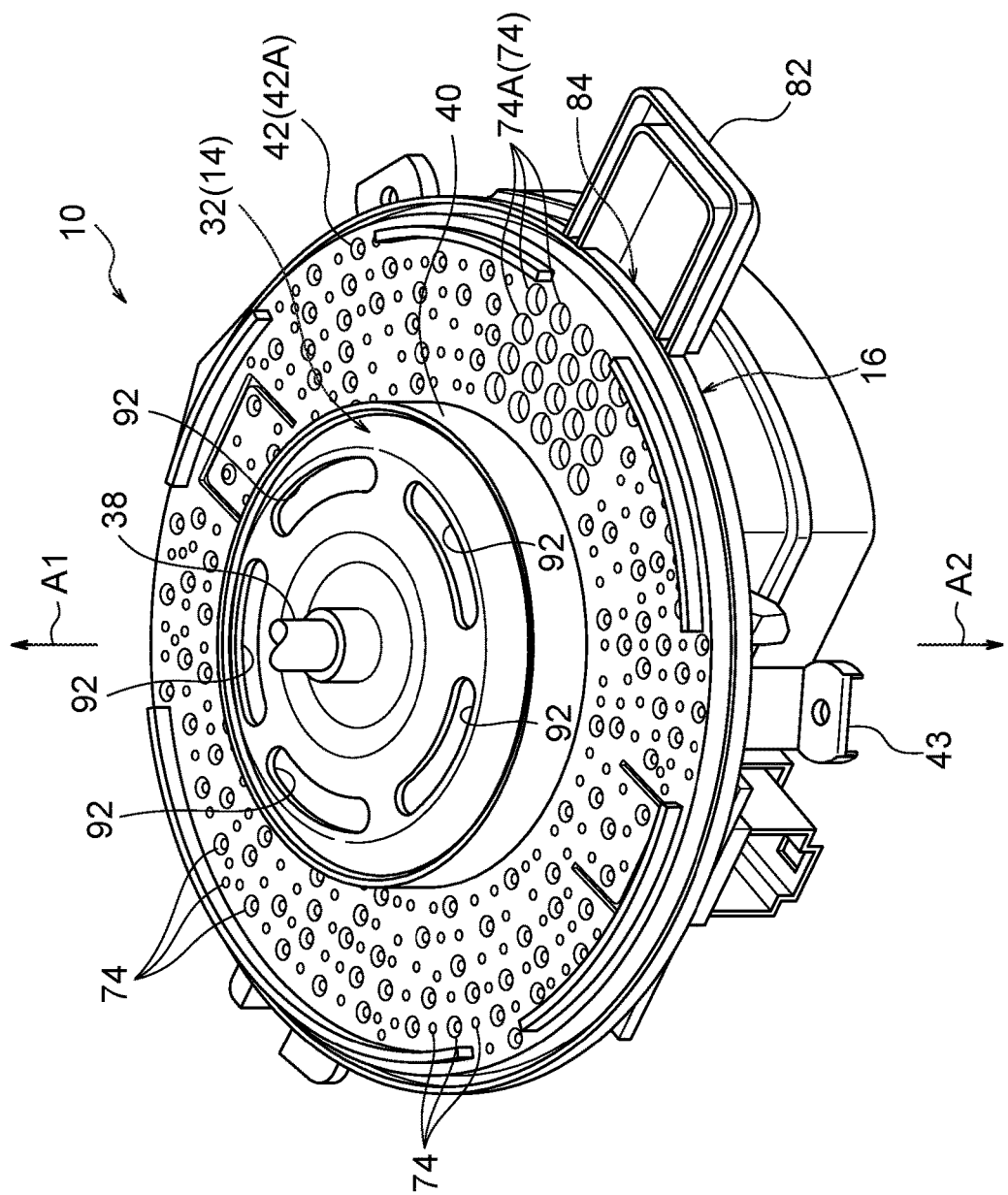
FIG. 2 is a perspective view of the motor illustrated in FIG. 1 as viewed from one axial direction side.

Plural vent holes 92 that pass through the rotor housing 32 in the axial direction are formed in the roof of the rotor housing 32. As viewed along the axial direction of the rotor housing 32, the plural vent holes 92 are formed at positions overlapping slots between the plural teeth 28 extending in a radiating pattern. As illustrated in FIG. 2, each of the plural vent holes 92 is formed in a circular arc shape extending about a circumferential direction of the rotor housing 32.

As illustrated in FIG. 1, in the motor 10, when the fan 70 rotates, positive pressure is created on the one axial direction side of the fan 70, and negative pressure is created on the other axial direction side of the fan 70. Cooling air W taken in through the cooling air intake port 80 flows through the inside of the cooling air intake section 78 from the one axial direction side to the other axial direction side of the duct 72.

Figure 3:
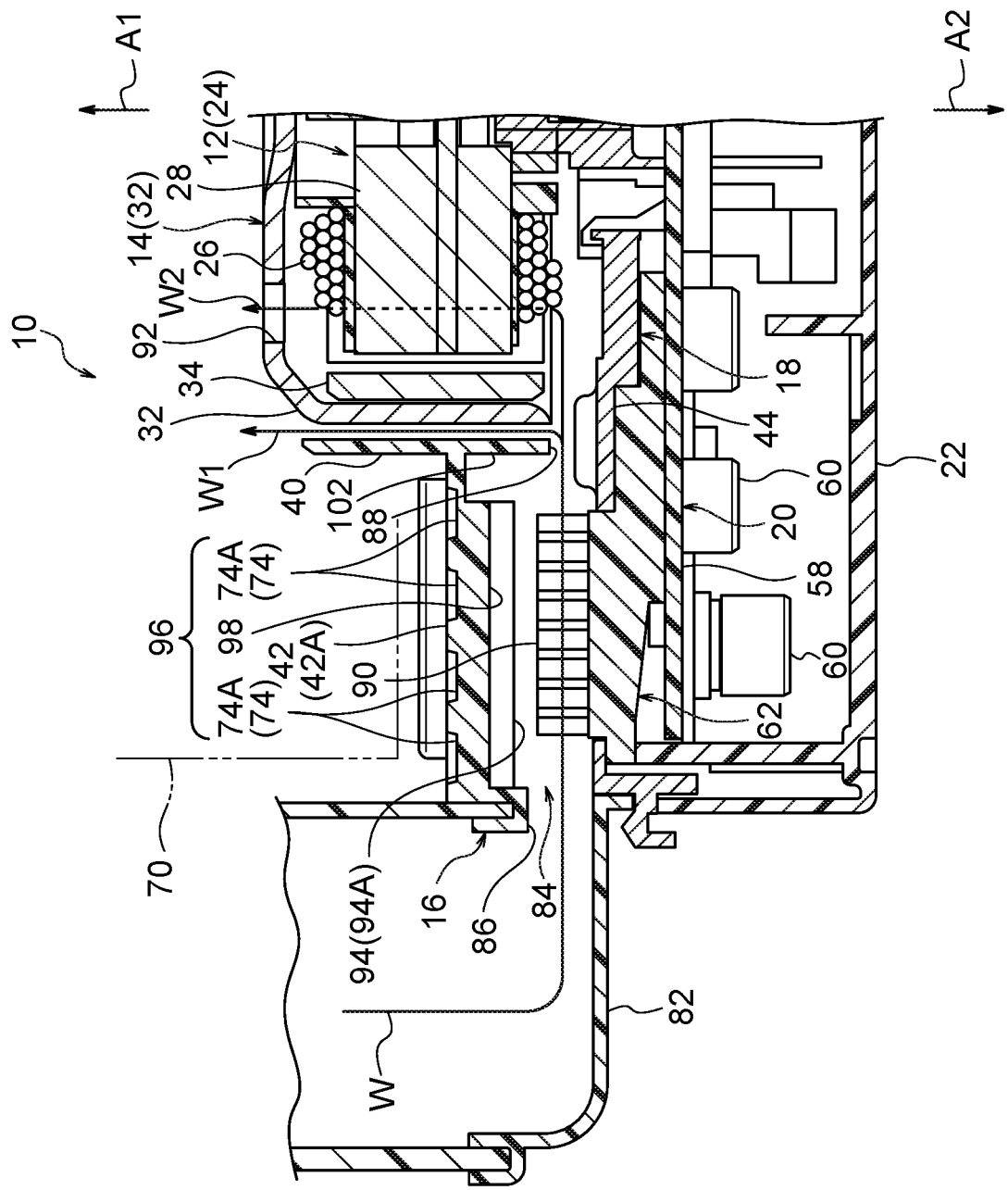
FIG. 3 is an enlarged vertical cross-section of relevant portions of the motor illustrated in FIG. 1.

As illustrated in enlarged view in FIG. 3, cooling air W that has entered the cooling air entry section 82 flows through the cooling air entry port 86 and along the cooling air flow path 84. The cooling air W that has flowed into the cooling air flow path 84 exchanges heat with the heat dissipation section 90 of the heat sink 62, thus cooling the heat dissipation section 90. By cooling the heat dissipation section 90, the mounted components 60 that are thermally coupled to the heat sink 62 are also cooled. The cooling air W that has flowed along the cooling air flow path 84 and undergone heat exchange with the heat dissipation section 90 in this manner is discharged from the cooling air flow path 84 through the cooling air discharge port 88.

Cooling air W1 configuring part of the cooling air W discharged from the cooling air flow path 84 is discharged toward the fan 70 through the gap between the circular tube portion 40 of the motor holder 16 and the rotor housing 32. Other cooling air W2 configuring part of the cooling air W discharged from the cooling air flow path 84 flows into the rotor housing 32. The cooling air W2 that has flowed into the rotor housing 32 exchanges heat with the stator core 24 and the windings 26, thereby cooling the stator core 24 and the windings 26 as it passes through the slots between the teeth 28. The cooling air W2 that has cooled the stator core 24 and the windings 26 passes through the vent holes 92 and is discharged toward the fan 70.

In the above-described motor 10, supposing a large gap were present between the top of the heat dissipation section 90 and the flange section 42, the cooling air W flowing along the cooling air flow path 84 would only hit a top side portion of the heat dissipation section 90, which could lower the heat dissipation efficiency of the heat sink 62.

In the first exemplary embodiment, the following structure is accordingly applied in order to improve the heat dissipation efficiency of the heat sink 62.

Figure 4:
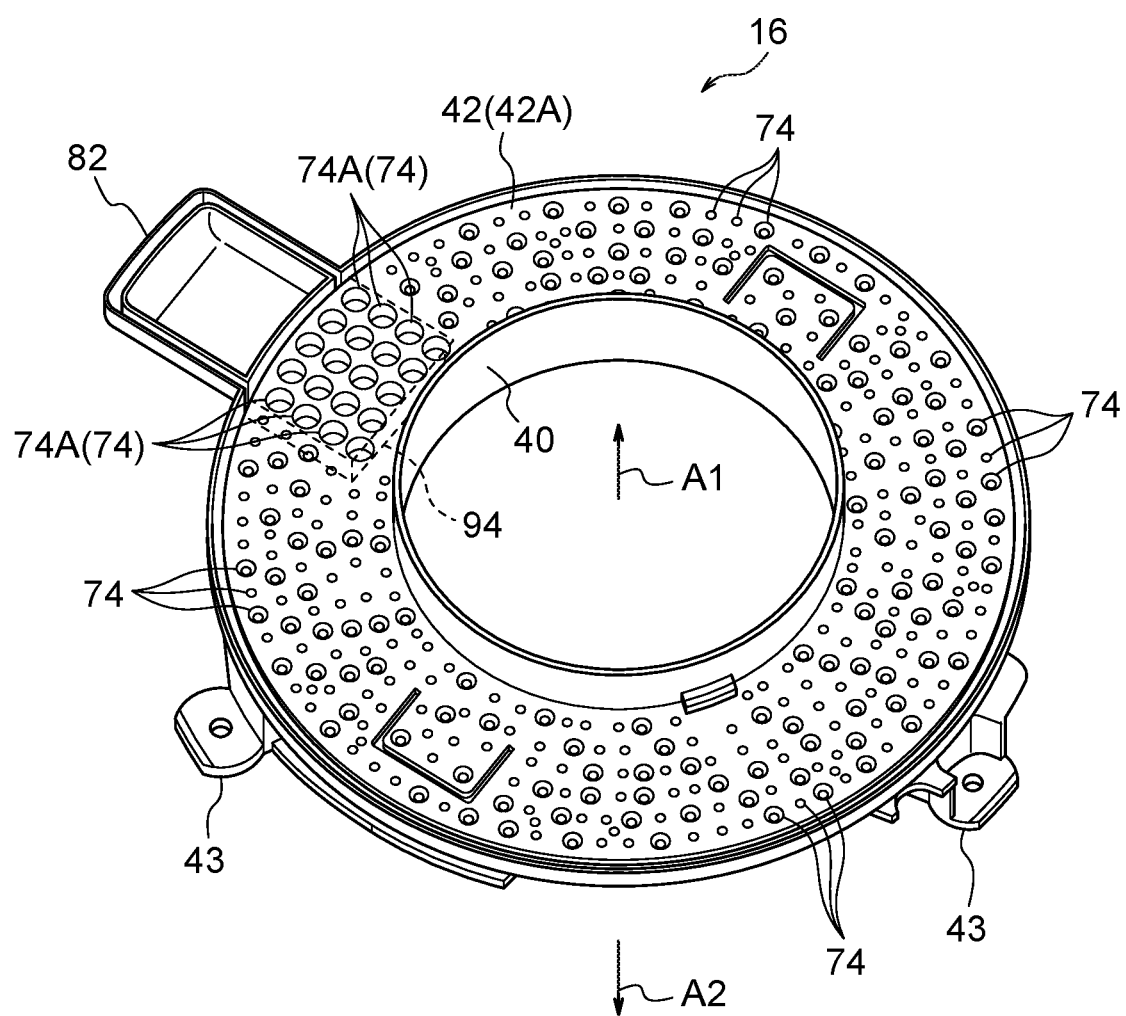
FIG. 4 is a perspective view of a motor holder illustrated in FIG. 1 as viewed from the one axial direction side.
Figure 5:
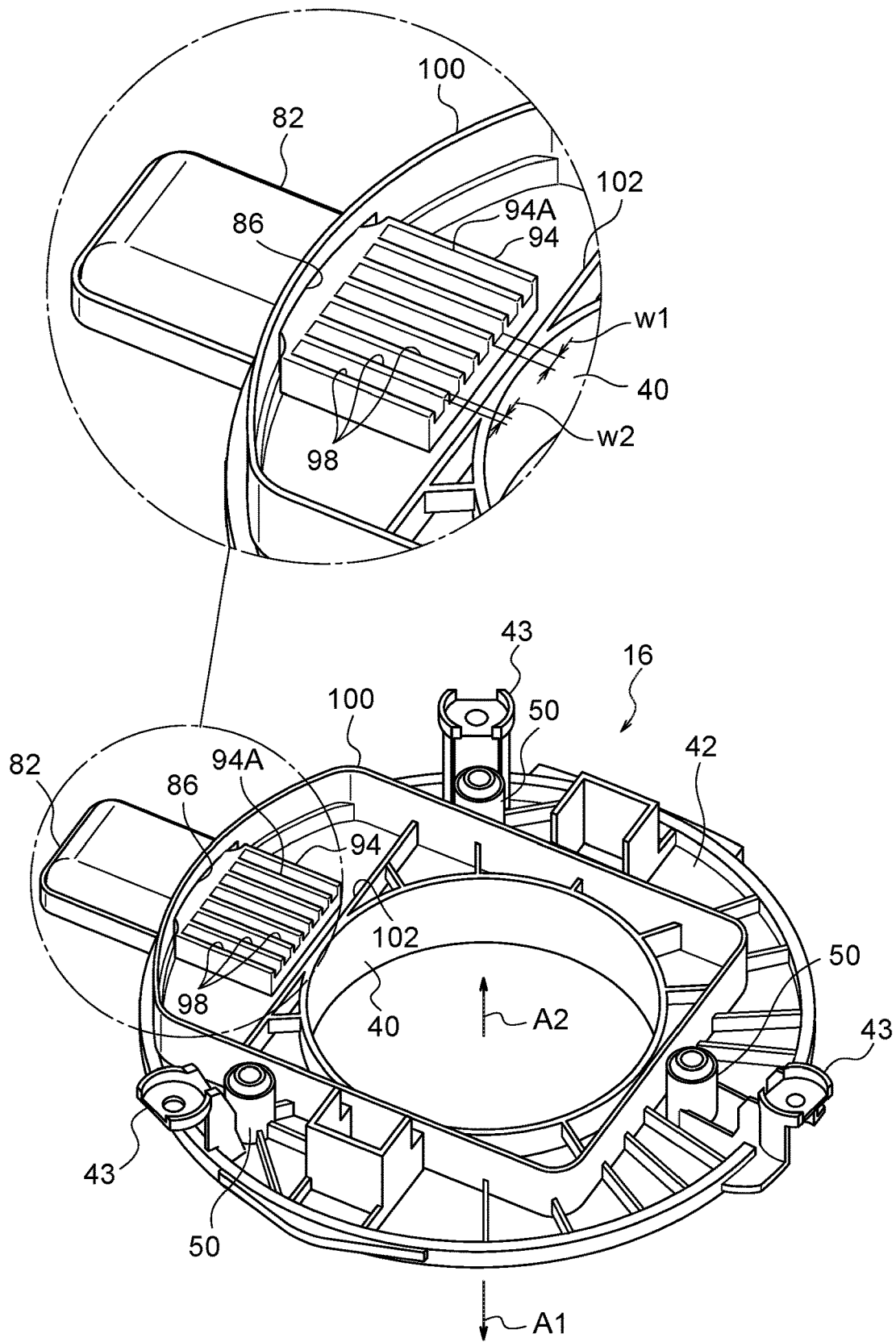
FIG. 5 is a perspective view of the motor holder illustrated in FIG. 1 as viewed from another axial direction side.

Namely, as illustrated in FIG. 3 to FIG. 5, a flow rectification section 94 is formed to a location of the flange section 42 opposing the heat dissipation section 90. The flow rectification section 94 is integrally formed with the flange section 42, and is formed with a flattened substantially cuboid shaped profile protruding from the flange section 42 toward the heat dissipation section 90.

A face on the heat dissipation section 90 side of the flow rectification section 94 forms a cooling air flow rectification face 94A extending along the cooling air flow path 84. The cooling air flow rectification face 94A opposes the top of the heat dissipation section 90 at a close distance. In this case, a close distance refers to a distance enabling the position of a cooling airflow to be redirected toward the heat dissipation section 90 side by the cooling air flow rectification face 94A so as to increase the rate of contact between the cooling air and the heat dissipation section 90.

The flow rectification section 94, including the cooling air flow rectification face 94A, is formed with a longer overall length than the heat dissipation section 90 along a length direction of the cooling air flow path 84, and overlaps the heat dissipation section 90 in the length direction of the cooling air flow path 84. Thus, an end portion on the cooling air entry port 86 side of the flow rectification section 94 is positioned further than the heat dissipation section 90 toward the cooling air entry port 86, and an end portion on the cooling air discharge port 88 side of the flow rectification section 94 is positioned further than the heat dissipation section 90 toward the cooling air discharge port 88.

When the flow rectification section 94 that has a flattened substantially cuboid shaped profile is integrally formed with the flange section 42, there is a possibility that sink marks (shrinking deformation) might occur on the flow rectification section 94 during molding of the resin motor holder 16, such that the desired finished shape of the flow rectification section 94 might not be achieved. A bulk reduction section 96 is accordingly formed to the flange section 42 between the face 42A at the opposite side from the plate-shaped section 44 and the cooling air flow rectification face 94A. Specifically, the bulk reduction section 96 includes plural grooves 98 formed on the heat dissipation section 90 side of the flow rectification section 94, and plural dimples 74A formed on the fan 70 side of the flow rectification section 94.

As illustrated in FIG. 3 and FIG. 5, each of the plural grooves 98 opens onto the cooling air flow rectification face 94A and extends along the cooling air flow path 84. The plural grooves 98 are formed in a row along a sideways width direction of the flow rectification section 94. The sideways width direction of the flow rectification section 94 corresponds to a direction orthogonal to the length direction of the cooling air flow path 84 (the radial direction of the flange section 42) as viewed along the plate thickness direction of the flange section 42.

Each of the plural grooves 98 is formed with the same width. As illustrated in FIG. 5, a width w1 of each of the grooves 98 is set with a larger dimension than a width w2 of protrusions formed between adjacent grooves 98. The plural grooves 98 are open at end portions at an opposite side from the cooling air entry port 86 (end portions on the side of the cooling air discharge port 88 illustrated in FIG. 3).

As illustrated in FIG. 4, out of the plural dimples 74 formed around the entire circumference of the flange section 42, the plural dimples 74A are formed at a position overlapping with the flow rectification section 94 as viewed along the plate thickness direction of the flange section 42. The plural dimples 74 include plural types, including small, medium, and large dimples 74 with different opening areas. The plural dimples 74A have the largest opening area out of the plural types of small, medium, and large dimples 74.

As illustrated in FIG. 5, in addition to the circular tube portion 40, an outer peripheral wall 100 and an upstand wall portion 102 are formed to the flange section 42 of the motor holder 16. The outer peripheral wall 100 and the upstand wall portion 102 project perpendicularly from the same face of the flange section 42 as the face formed with the flow rectification section 94, namely, the face on the other axial direction side of the flange section 42.

The outer peripheral wall 100 is formed with a substantially rectangular shaped profile so as to surround the periphery of the circular tube portion 40. The cooling air entry port 86 described previously is formed passing through a location of the outer peripheral wall 100 corresponding to the cooling air entry section 82. The sideways width of the flow rectification section 94 is substantially the same as the sideways width of the cooling air entry port 86.

The upstand wall portion 102 is formed between the flow rectification section 94 and the circular tube portion 40. The upstand wall portion 102 extends in a direction orthogonal to the radial direction of the flange section 42 (orthogonal to the length direction of the cooling air flow path 84 illustrated in FIG. 3) as viewed along the plate thickness direction of the flange section 42. Both end portions of the upstand wall portion 102 are connected to the outer peripheral wall 100, and a central portion of the upstand wall portion 102 is integrated with the circular tube portion 40. As illustrated in FIG. 3, the upstand wall portion 102 projects perpendicularly from the flange section 42 toward the plate-shaped section 44. The cooling air discharge port 88 described previously is formed between the upstand wall portion 102 and the plate-shaped section 44.

A height direction end portion (an end portion on the plate-shaped section 44 side) of the upstand wall portion 102 is located at the same position as an opening end portion of the rotor housing 32, or is positioned further toward the plate-shaped section 44 side than the opening end portion of the rotor housing 32. The height direction end portion of the upstand wall portion 102 is also positioned further than the top of the heat dissipation section 90 toward the plate-shaped section 44 side, such that a location on the height direction end portion side of the upstand wall portion 102 overlaps a location on the top side of the heat dissipation section 90 in the axial direction of the motor 10.

Figure 6:
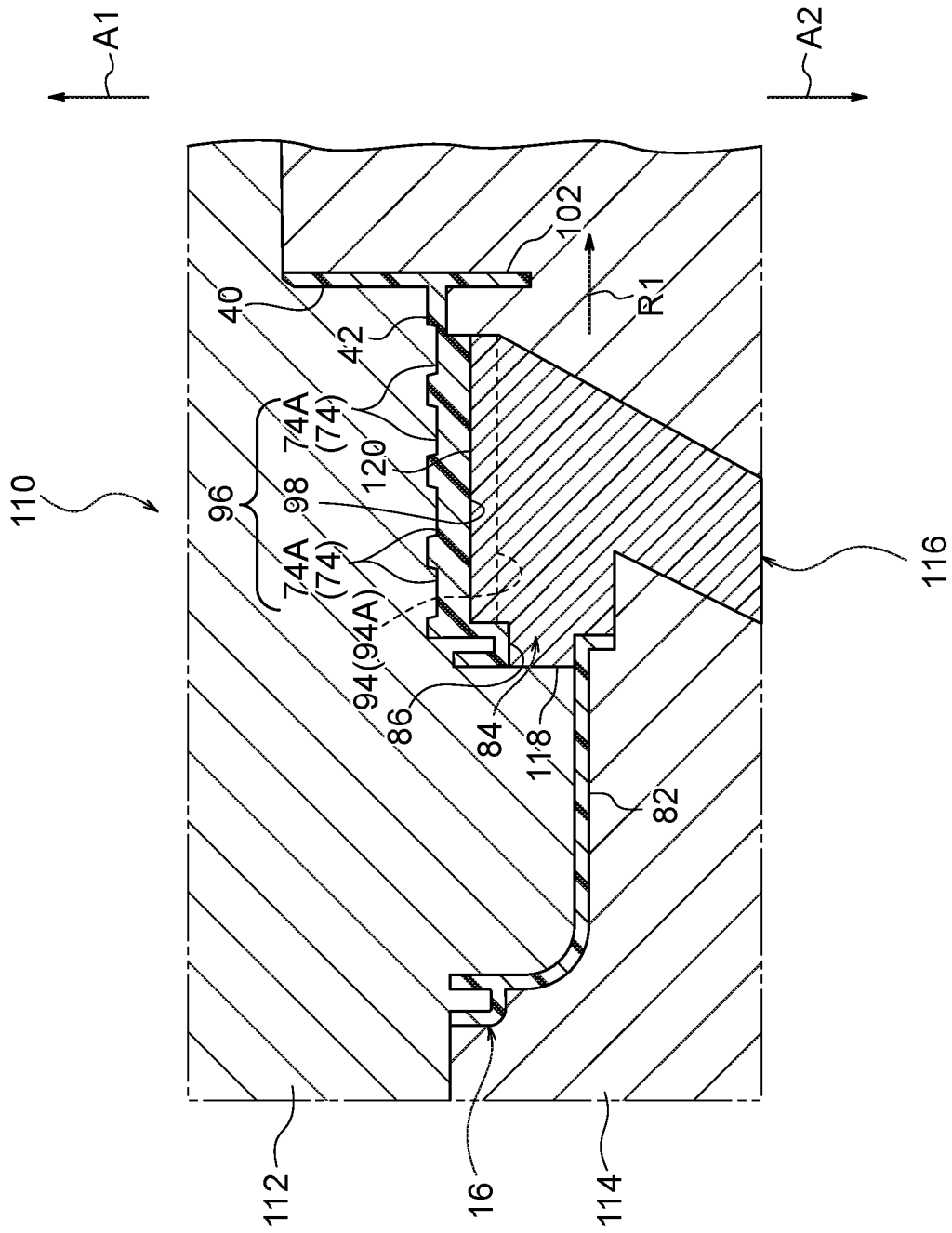
FIG. 6 is a vertical cross-section illustrating the motor holder illustrated in FIG. 1 being molded in a mold.

Note that the motor holder 16 including the above-described flow rectification section 94 and upstand wall portion 102 is, for example, molded from resin using a mold 110 such as that illustrated in FIG. 6. The mold 110 is provided with a fixed mold 112 and a movable mold 114, divided in the axial direction of the motor holder 16, and a sliding mold 116. The sliding mold 116 is formed with a mold portion 118 that forms the cooling air flow path 84 and a mold portion 120 that forms the grooves 98.

In order to remove the motor holder 16 from the mold 110 after the resin motor holder 16 has been molded from resin in the mold 110, first, the movable mold 114, the sliding mold 116, and the motor holder 16 are moved toward the arrow A2 side with respect to the fixed mold 112. The motor holder 16 and the sliding mold 116 are then moved toward the arrow A1 side with respect to the movable mold 114, and the sliding mold 116 is moved toward a radial direction inside of the motor holder 16 (the arrow R1 side) until a leading end portion of the mold portion 118 has come out of the cooling air entry port 86. The motor holder 16 is thereby removed from the mold 110.

Note that since the plural grooves 98 formed in order to reduce the bulk of the flow rectification section 94 are formed opening onto the cooling air flow rectification face 94A, the plural grooves 98 are open in the axial direction of the motor holder 16. Thus, the length of the plural grooves 98 does not affect a slide amount of the sliding mold 116 as it slides along the radial direction of the motor holder 16.

Namely, the slide amount of the sliding mold 116 as it slides along the radial direction of the motor holder 16 is set to a length at which the leading end portion of the mold portion 118 comes out from the cooling air entry port 86, irrespective of the length of the grooves 98. Thus, in the first exemplary embodiment described above, the flow rectification section 94, including the cooling air flow rectification face 94A, can be formed with a longer overall length than the heat dissipation section 90 along the length direction of the cooling air flow path 84.

Explanation follows regarding operation and advantageous effects of the first exemplary embodiment of the present disclosure.

Explanation first follows regarding a first comparative example and a second comparative example in order to clarify the operation and advantageous effects of the first exemplary embodiment.

Figure 15:
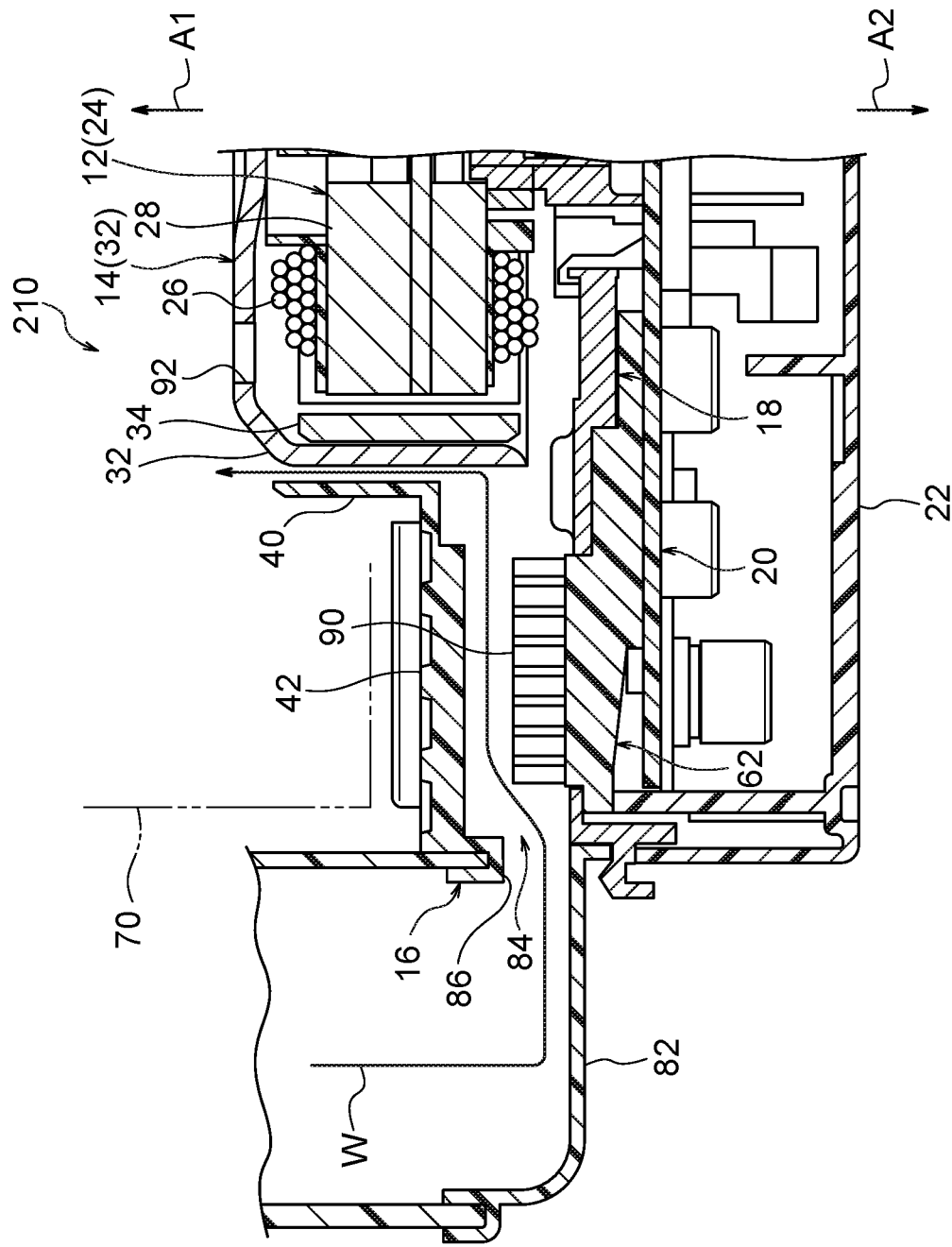
FIG. 15 is an enlarged vertical cross-section of relevant portions of a motor according to a first comparative example.

As illustrated in FIG. 15, in contrast to the above-described first exemplary embodiment, the flow rectification section 94 and the upstand wall portion 102 (see FIG. 3) are omitted from a motor 210 according to the first comparative example. In the motor 210 according to the first comparative example, there is a large gap between the top of the heat dissipation section 90 and the flange section 42, and so cooling air flowing along the cooling air flow path 84 only hits a top side portion of the heat dissipation section 90. This might lower the heat dissipation efficiency of the heat sink 62.

Moreover, in the motor 210 according to the first comparative example, cooling air flowing along the cooling air flow path 84 flows out through the gap between the circular tube portion 40 and the rotor housing 32, and so the stator core 24 and the windings 26 cannot be efficiently cooled.

Figure 16:
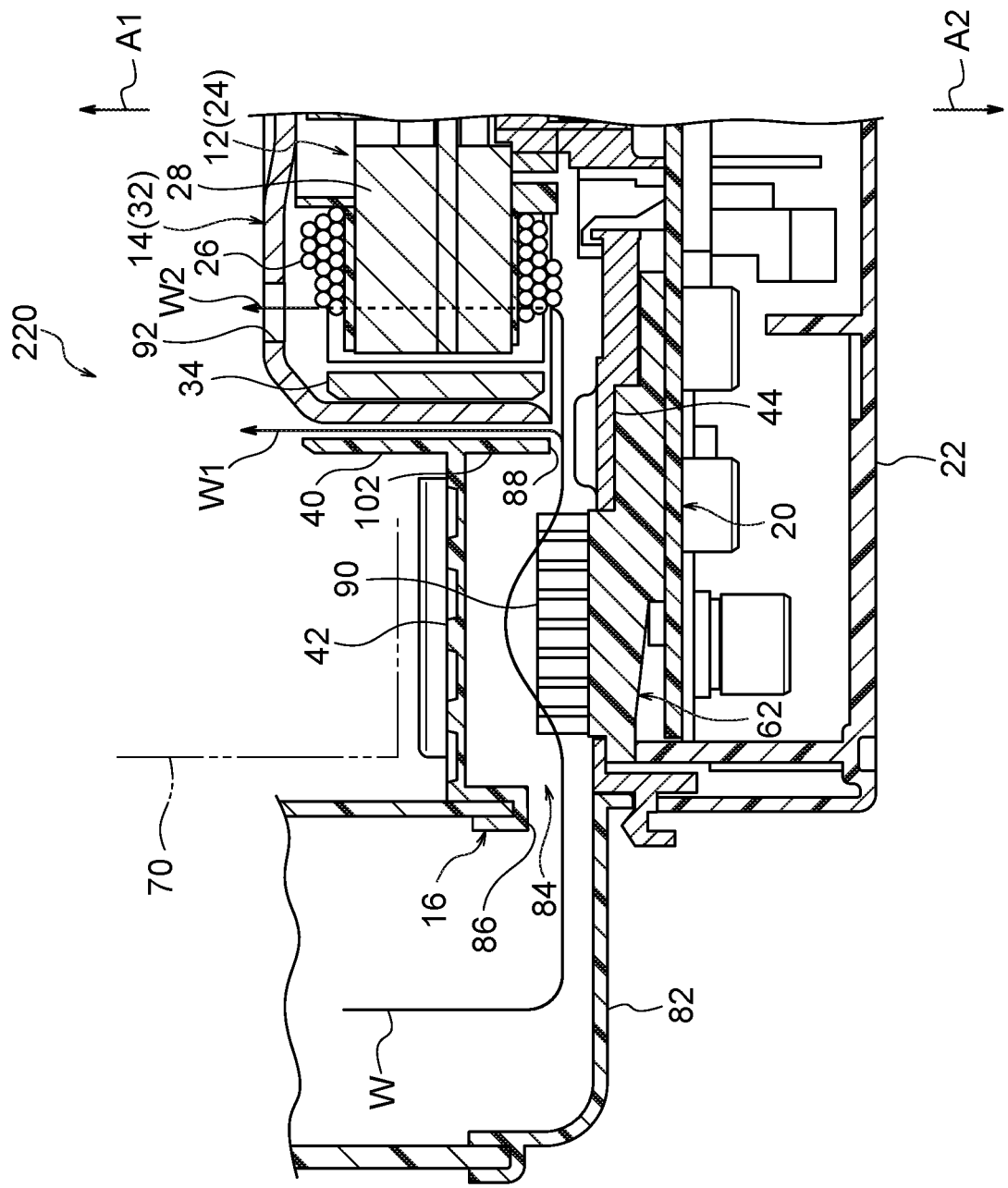
FIG. 16 is an enlarged vertical cross-section of relevant portions of a motor according to a second comparative example.

In contrast to the first comparative example described above, a motor 220 according to the second comparative example illustrated in FIG. 16 includes the upstand wall portion 102. In the motor 220 according the second comparative example, although cooling air that has flowed in through the cooling air entry port 86 temporarily rises toward the flange section 42, the cooling air can be redirected toward the plate-shaped section 44 by the upstand wall portion 102. This enables the rate of contact between the cooling air and the heat dissipation section 90 to be improved.

However, in the motor 220 according to the second comparative example, although the position of the flow of cooling air is redirected toward the plate-shaped section 44 at the side of the cooling air discharge port 88 formed between the upstand wall portion 102 and the plate-shaped section 44, there is still a large gap present between the top of the heat dissipation section 90 and the flange section 42, and so the cooling air flowing along the cooling air flow path 84 only hits a top side portion of the heat dissipation section 90. Thus, there is still room for improvement in the heat dissipation efficiency of the heat sink 62 in the motor 220 according to the second comparative example.

In contrast thereto, in the motor 10 according to the first exemplary embodiment as illustrated in FIG. 3, the flow rectification section 94 including the cooling air flow rectification face 94A extending along the cooling air flow path 84 is integrally formed with the flange section 42, and the cooling air flow rectification face 94A of the flow rectification section 94 opposes the top of the heat dissipation section 90 at a close distance. This enables the position of the cooling airflow to be redirected toward the heat dissipation section 90 by the cooling air flow rectification face 94A, enabling the rate of contact between the cooling air and the heat dissipation section 90 to be improved.

Further, the bulk reduction section 96 is formed between the face 42A of the flange section 42 at the opposite side from the plate-shaped section 44 and the cooling air flow rectification face 94A. The volume of the flow rectification section 94 is therefore reduced by an amount commensurate to the formation of the bulk reduction section 96, thereby enabling the occurrence of sink marks (shrinking deformation) on the flow rectification section 94 to be suppressed when the motor holder 16, including the flow rectification section 94, is being molded. This enables the desired finished shape of the flow rectification section 94 to be achieved.

This enables cooling air to be made to hit the heat dissipation section 90 in an appropriate manner, thereby enabling efficient heat exchange between the cooling air and the heat dissipation section 90. This enables the heat dissipation efficiency of the heat sink 62 to be improved.

Moreover, in the motor 10 according to the first exemplary embodiment, the upstand wall portion 102 projects perpendicularly from the flange section 42 toward the plate-shaped section 44, and the cooling air discharge port 88 is formed between the upstand wall portion 102 and the plate-shaped section 44. Accordingly, the cooling air discharge port 88 is positioned at the plate-shaped section 44 side, and due to forming the upstand wall portion 102, the position of the cooling airflow heading toward the cooling air discharge port 88 can be maintained on the plate-shaped section 44 side while the cooling air flow is rectified by the flow rectification section 94. This enables the position of the cooling airflow to be suppressed from straying from the heat dissipation section 90, and enables the cooling air to be made to hit the heat dissipation section 90 in a still more appropriate manner.

Moreover, the cooling air flow rectification face 94A of the flow rectification section 94 opposes the top of the heat dissipation section 90 at a close distance. Narrowing the gap between the cooling air flow rectification face 94A of the flow rectification section 94 and the top of the heat dissipation section 90 in this manner enables the flow rate of cooling air flowing between the cooling air flow rectification face 94A of the flow rectification section 94 and the top of the heat dissipation section 90 to be increased. This enables still more efficient heat exchange between the cooling air and the heat dissipation section 90.

Further, in the motor 10 according to the first exemplary embodiment, the flow rectification section 94 is configured so as to protrude from the flange section 42 toward the plate-shaped section 44, thereby enabling the flow rectification section 94 to be easily formed by molding.

Moreover, the bulk reduction section 96 includes the grooves 98 that open onto the cooling air flow rectification face 94A, and the grooves 98 extend along the cooling air flow path 84. This enables the cooling air to be guided along the length direction of the cooling air flow path 84, while the grooves 98 also suppress the occurrence of sink marks in the flow rectification section 94. This enables the cooling air to flow smoothly along the cooling air flow path 84, thereby enabling heat exchange between the cooling air and the heat dissipation section 90 to be promoted, and also enabling the heat dissipation efficiency of the heat sink 62 to be still further improved.

Moreover, forming the bulk reduction section 96 to the flow rectification section 94 enables the volume of the flow rectification section 94 to be reduced, enabling the time (cycle time) required to mold the motor holder 16, including the flow rectification section 94, from resin to be reduced.

Moreover, since the plural grooves 98 formed to reduce the bulk of the flow rectification section 94 are formed opening onto the cooling air flow rectification face 94A, the length of the plural grooves 98 does not affect the slide amount of the sliding mold 116 (see FIG. 6) as it slides along the radial direction of the motor holder 16. The flow rectification section 94, including the cooling air flow rectification face 94A, is thus formed with a longer overall length than the heat dissipation section 90 along the length direction of the cooling air flow path 84. This enables the position of the cooling airflow to be rectified such that the cooling air hits the heat dissipation section 90 over the entire length of the heat dissipation section 90, thereby enabling still more efficient heat exchange between the cooling air and the heat dissipation section 90.

Moreover, as illustrated in FIG. 5, the width w1 of each of the grooves 98 is set with a larger dimension than the width w2 of the protrusions formed between adjacent of the grooves 98. This enables the volume of the flow rectification section 94 to be still more effectively reduced while guiding the cooling air along the length direction of the cooling air flow path 84 using the plural grooves 98.

Moreover, as illustrated in FIG. 4, the plural dimples 74 formed to the flange section 42 are arrayed in the circumferential direction and the radial direction of the flange section 42, and each of the plural dimples 74 opens onto the face 42A of the flange section 42 at the opposite side from the plate-shaped section 44. Thus, in cases in which the fan 70 is fixed to the rotor 14 and the fan 70 opposes the flange section 42 from the opposite side to the plate-shaped section 44 as in the present exemplary embodiment, the plural dimples 74 create a turbulent flow as the fan 70 rotates, thereby enabling the generation of low frequency noise between the fan 70 and the flange section 42 to be suppressed.

Further, out of the plural dimples 74, the bulk reduction section 96 includes the dimples 74A formed at positions overlapping with the flow rectification section 94 as viewed along the plate thickness direction of the flange section 42. Some of plural dimples 74 for suppressing low frequency noise are thereby utilized in the bulk reduction section 96 in order to suppress sink marks in the flow rectification section 94, thereby enabling the structure of the flow rectification section 94 to be simplified compared to cases in which a dedicated bulk reduction section 96 is employed. Note that the dimples 74A do not have to be configured with a large opening area, and the dimples 74A may be approximately the same size as the other dimples, depending on the size of the grooves 98 used to reduce the bulk.

Explanation follows regarding modified examples of the first exemplary embodiment of the present disclosure.

Figure 7:
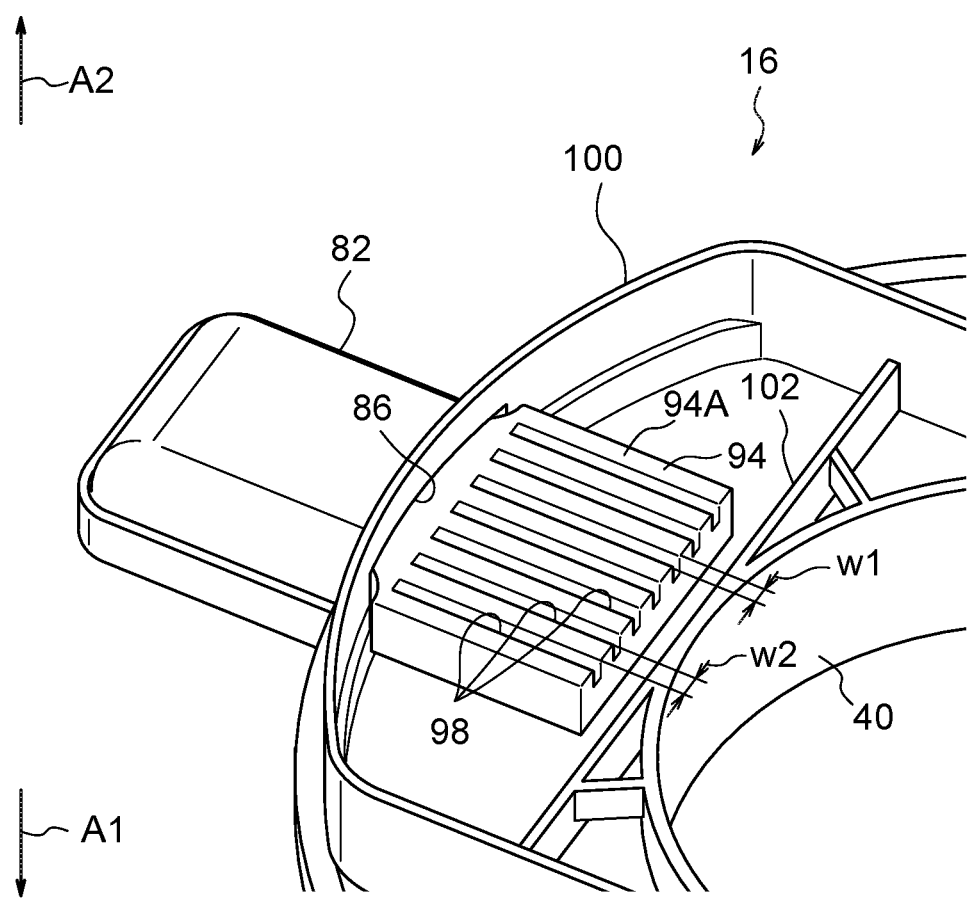
FIG. 7 is a perspective view illustrating a modified example of a flow rectification section formed to the motor holder illustrated in FIG. 1.

In the first exemplary embodiment, the width w1 of each of the grooves 98 is set with a larger dimension than the width w2 of the protrusions formed between adjacent of the grooves 98. However, as illustrated in FIG. 7, the width w1 of each of the grooves 98 may be set with a smaller dimension than the width w2 of the protrusions formed between adjacent of the grooves 98.

Such a configuration enables the cross-section area of the flow path between the flow rectification section 94 and the heat dissipation section 90 to be narrowed while still reducing the volume of the flow rectification section 94. This enables the flow rate of cooling air flowing between the cooling air flow rectification face 94A of the flow rectification section 94 and the top of the heat dissipation section 90 to be increased while redirecting the position of the cooling airflow toward the heat dissipation section 90, thereby enabling still more efficient heat exchange between the cooling air and the heat dissipation section 90.

Moreover, although plural of the grooves 98 are formed in the flow rectification section 94 in the first exemplary embodiment, the number of grooves 98 may be just one.

Moreover, although the end portions on the cooling air discharge port 88 side of the plural grooves 98 are open toward the cooling air discharge port 88, the end portions on the cooling air discharge port 88 side of the plural grooves 98 may be closed off.

Second Exemplary Embodiment

Explanation follows regarding a second exemplary embodiment of the present disclosure.

Figure 8:
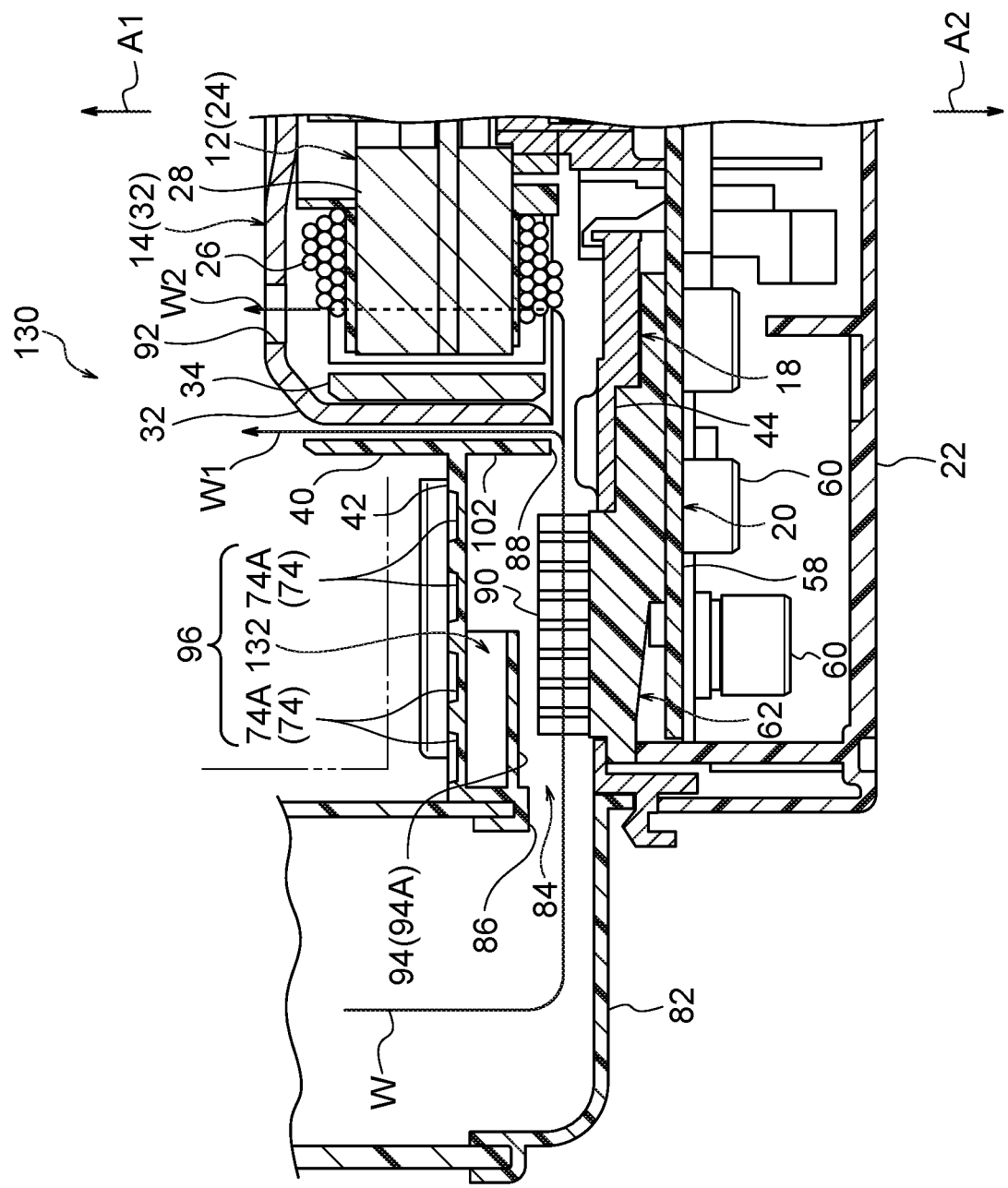
FIG. 8 is an enlarged vertical cross-section of relevant portions of a motor according to a second exemplary embodiment.

As illustrated in FIG. 8, in a motor 130 according to the second exemplary embodiment, configuration of the bulk reduction section 96 formed to the flow rectification section 94 is altered in the following manner with respect to that of the motor 10 according to the first exemplary embodiment (see FIG. 3) previously described.

Figure 9:
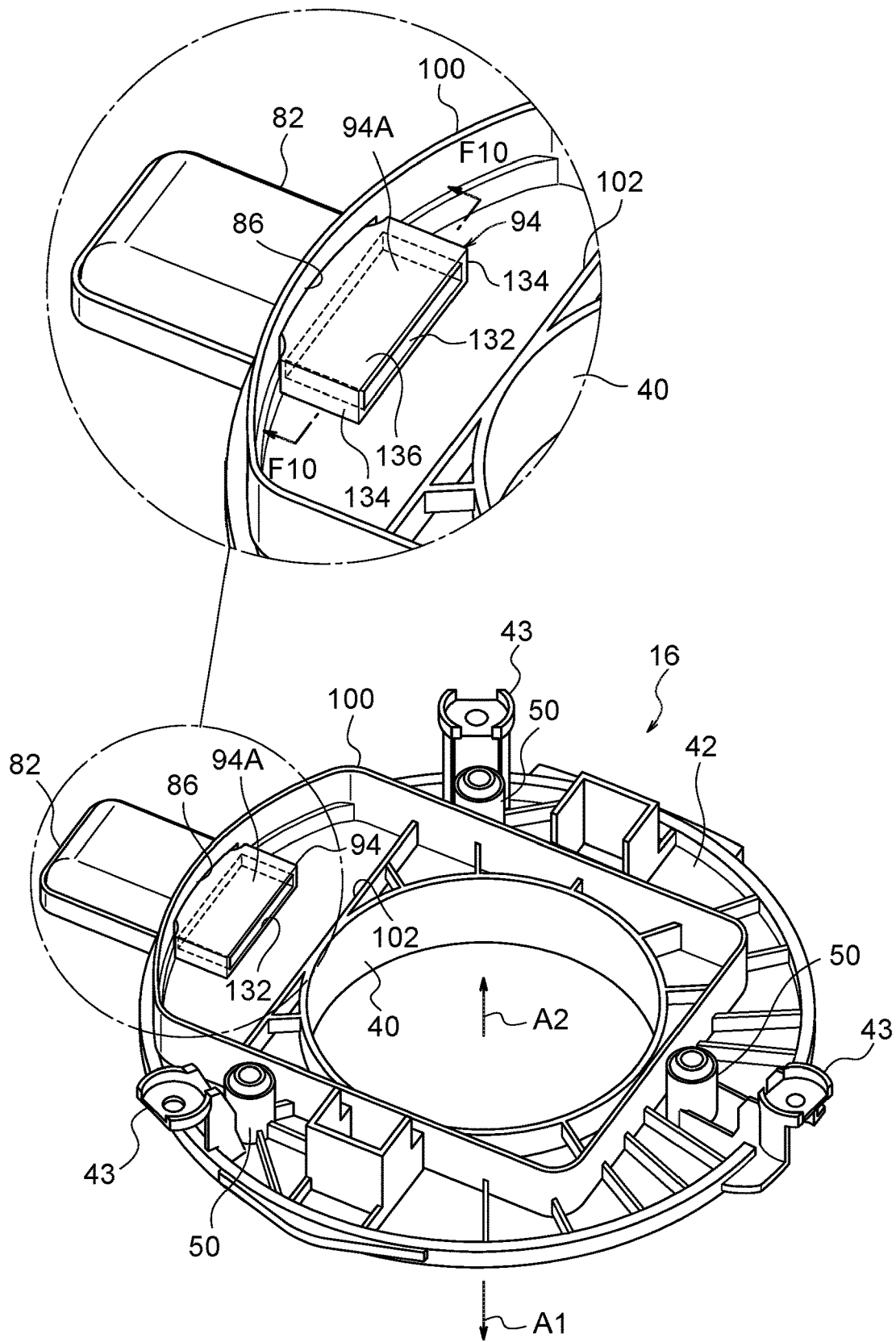
FIG. 9 is a perspective view of a motor holder illustrated in FIG. 8 as viewed from the other axial direction side.
Figure 10:
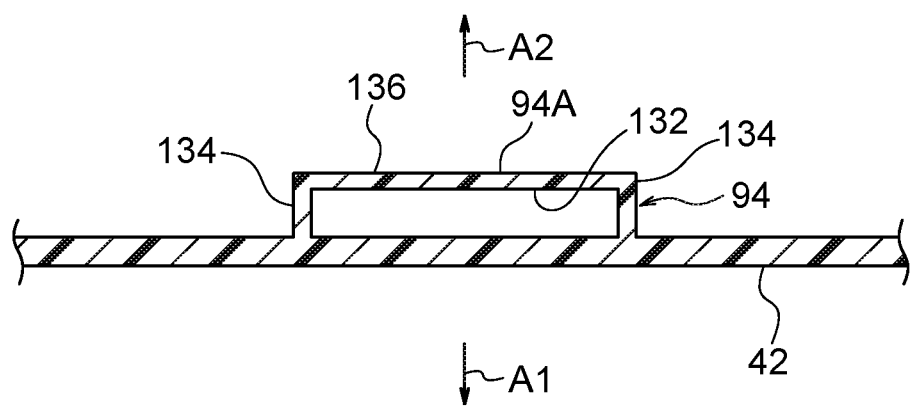
FIG. 10 is a cross-section sectioned along line F10-F10 in FIG. 9.

Namely, in the motor 130 according to the second exemplary embodiment, the bulk reduction section 96 includes a cavity 132 formed in an inner portion of the flow rectification section 94 in addition to the plural dimples 74A. As illustrated in FIG. 8 and FIG. 9, the cavity 132 is open toward the radial direction inside of the flange section 42. Similarly to in the first exemplary embodiment, the flow rectification section 94 protrudes from the flange section 42 toward the heat dissipation section 90. As illustrated in FIG. 9 and FIG. 10, the flow rectification section 94 internally formed with the cavity 132 includes a pair of side wall portions 134 and a roof wall portion 136, and a face on the heat dissipation section 90 side of the roof wall portion 136 forms the cooling air flow rectification face 94A previously described.

As illustrated in FIG. 8, the flow rectification section 94, including the cooling air flow rectification face 94A, is formed with a shorter overall length along the length direction of the cooling air flow path 84 than in the first exemplary embodiment. Thus, although the end portion on the cooling air entry port 86 side of the flow rectification section 94 is positioned further than the heat dissipation section 90 toward the cooling air entry port 86, the end portion on the cooling air discharge port 88 side of the flow rectification section 94 is at a position stopping short of (further toward the cooling air entry port 86 than) the end portion on the cooling air discharge port 88 side of the heat dissipation section 90.

Figure 11:
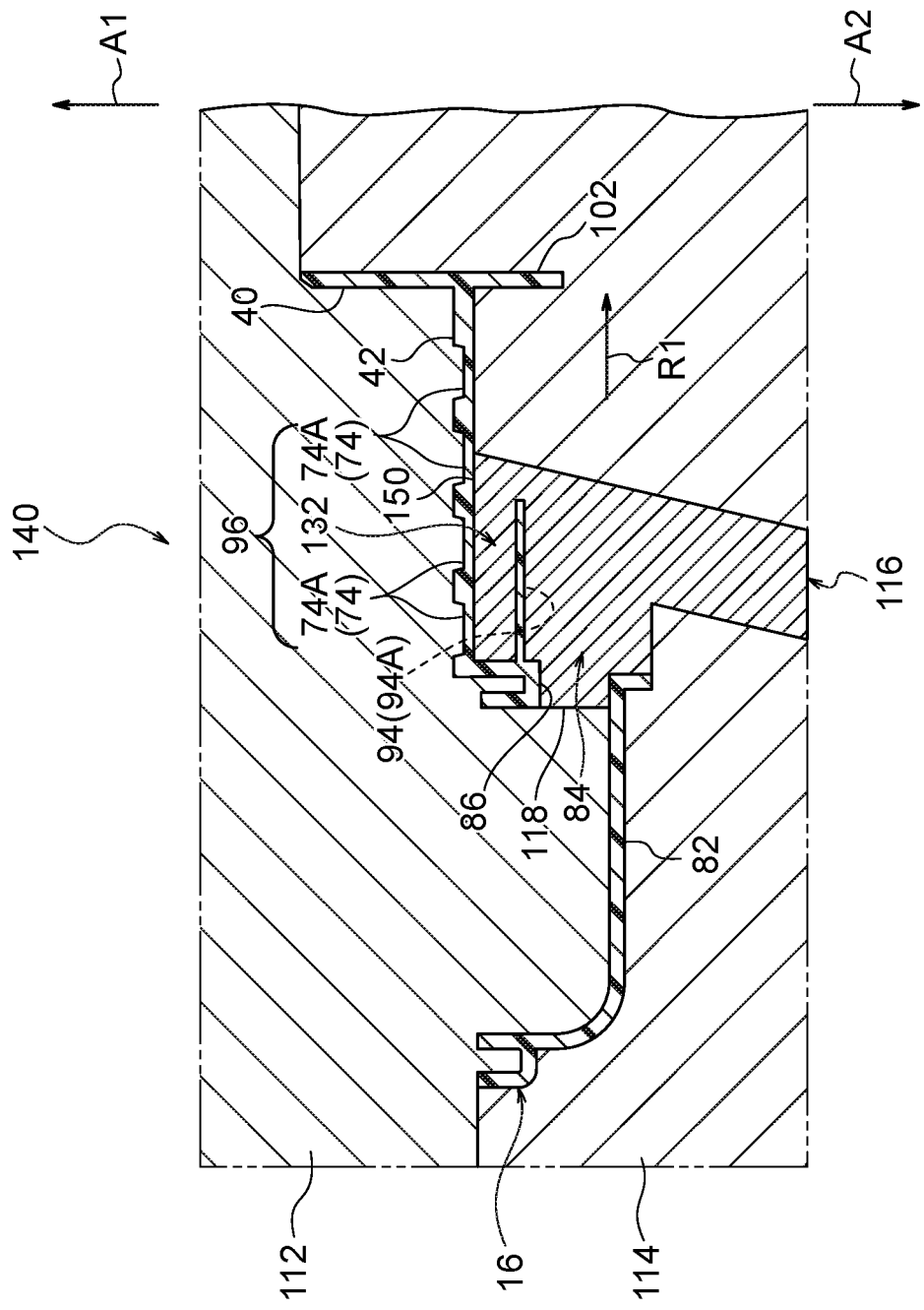
FIG. 11 is a vertical cross-section illustrating the motor holder illustrated in FIG. 8 being molded in a mold.

Note that the motor holder 16 including the above-described flow rectification section 94 and the upstand wall portion 102 is for example formed by molding from resin using a mold 140 illustrated in FIG. 11. In the mold 140, configuration of the sliding mold 116 is altered with respect to that of the first exemplary embodiment described previously, such that the sliding mold 116 is formed with a mold portion 150 for forming the cavity 132 in addition to the mold portion 118 for forming the cooling air flow path 84.

In order to remove the motor holder 16 from the mold 140 after the motor holder 16 has been molded from resin using the mold 140, first, the movable mold 114, the sliding mold 116, and the motor holder 16 are moved toward the arrow A2 side with respect to the fixed mold 112. The motor holder 16 and the sliding mold 116 are then moved toward the arrow A1 side with respect to the movable mold 114, and the sliding mold 116 is moved toward the radial direction inside of the motor holder 16 (the arrow R1 side) until the mold portion 150 has come out of the cavity 132. After the mold portion 150 has come out of the cavity 132, the motor holder 16 is then lifted using a non-illustrated ejector pin, such that the motor holder 16 is completely freed from the sliding mold 116. The motor holder 16 is thereby removed from the mold 140.

Note that since the cavity 132 formed to reduce the bulk of the flow rectification section 94 is formed in the inner portion of the flow rectification section 94, the cavity 132 is open toward the radial direction inside of the motor holder 16. The opening in the cavity 132 opposes the upstand wall portion 102. Thus, the length of the cavity 132 affects the slide amount of the sliding mold 116 as it slides along the radial direction of the motor holder 16.

Namely, the slide amount of the sliding mold 116 as it slides along the radial direction of the motor holder 16 is set to the length at which the mold portion 150 comes out from the cavity 132. Thus, the flow rectification section 94, including the cooling air flow rectification face 94A, is formed with a shorter overall length along the length direction of the cooling air flow path 84 than in the first exemplary embodiment.

Explanation follows regarding operation and advantageous effects of the second exemplary embodiment of the present disclosure where they differ from those in the first exemplary embodiment previously described.

As illustrated in FIG. 8, in the motor 130 according to the second exemplary embodiment, the bulk reduction section 96 includes the cavity 132 formed in the inner portion of the flow rectification section 94. The bulk reduction amount of the flow rectification section 94 is thereby secured by the cavity 132, enabling the volume of the flow rectification section 94 to be even more effectively reduced, and thereby enabling the occurrence of sink marks in the flow rectification section 94 to be still more effectively suppressed.

Moreover, as illustrated in FIG. 9, the flow rectification section 94 internally formed with the cavity 132 includes the pair of side wall portions 134 on the two sides of the roof wall portion 136 that includes the cooling air flow rectification face 94A, thereby enabling the support rigidity of the roof wall portion 136 that includes the cooling air flow rectification face 94A to be increased.

Explanation follows regarding modified examples of the second exemplary embodiment of the present disclosure.

Although the cavity 132 is open toward the radial direction inside of the motor holder 16 in the second exemplary embodiment, the cavity 132 may be open toward the radial direction outside of the motor holder 16. In such cases, the overall length of the flow rectification section 94, including the cooling air flow rectification face 94A, may be formed longer than that of the heat dissipation section 90 along the length direction of the cooling air flow path 84.

Moreover, although the bulk reduction section 96 includes the cavity 132 and the plural dimples 74A in the second exemplary embodiment, the bulk reduction section 96 may also include the grooves 98 (see FIG. 3) of the first exemplary embodiment previously described in addition to the cavity 132 and the plural dimples 74A.

Third Exemplary Embodiment

Next, explanation follows regarding a third exemplary embodiment of the present disclosure.

Figure 12:
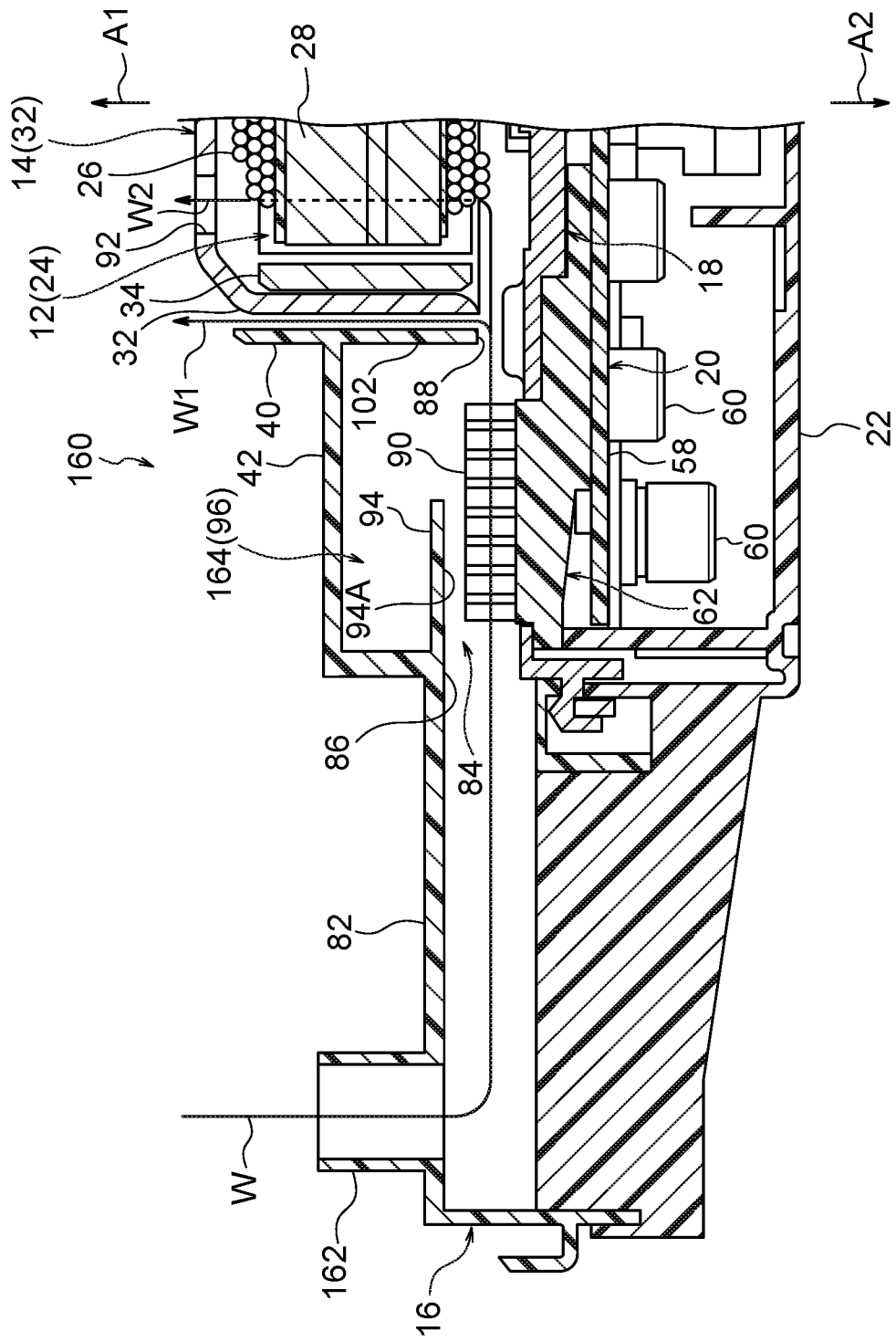
FIG. 12 is an enlarged vertical cross-section of relevant portions of a motor according to a third exemplary embodiment.

As illustrated in FIG. 12, configuration of a motor 160 according to the third exemplary embodiment is altered in the following manner with respect to that of the motor 10 according to the first exemplary embodiment (see FIG. 3) previously described. Namely, a circular-tube-shaped inlet 162 is formed in the cooling air entry section 82. Cooling air that has entered the cooling air entry section 82 through the inside of the inlet 162 flows into the cooling air flow path 84 through the cooling air entry port 86.

Moreover, in the motor 160 according to the third exemplary embodiment, configuration of the bulk reduction section 96 formed to the flow rectification section 94 is altered in the following manner with respect to that of the motor 10 according to the first exemplary embodiment (see FIG. 3) previously described. Namely, the bulk reduction section 96 includes a space 164 formed between the flange section 42 and the cooling air flow rectification face 94A.

Figure 13:
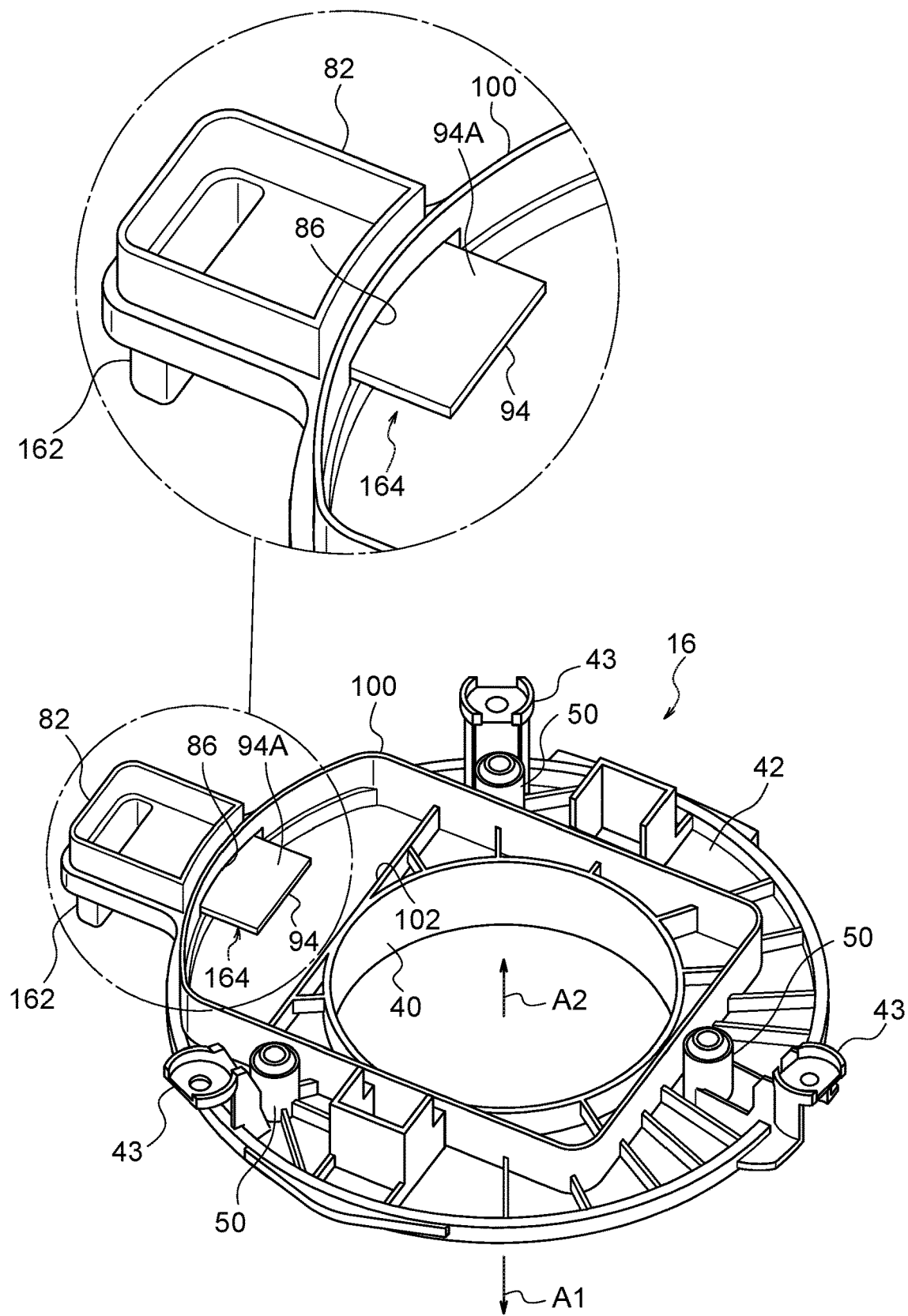
FIG. 13 is a perspective view of a motor holder illustrated in FIG. 12 as viewed from the other axial direction side.

Due to this bulk reduction section 96, the flow rectification section 94 is formed in a plate shape extending along the cooling air flow path 84. Namely, the flow rectification section 94 is formed in a plate shape as a result of reducing the bulk by forming the space 164 between the flange section 42 and the cooling air flow rectification face 94A (see FIG. 13 also).

The flow rectification section 94 includes a base end portion at the flange section 42 outer peripheral side of the flow rectification section 94 and a leading end portion at the flange section 42 inner peripheral side of the flow rectification section 94. A face on the heat dissipation section 90 side of the plate shaped flow rectification section 94 forms the cooling air flow rectification face 94A described previously.

The flow rectification section 94, including the cooling air flow rectification face 94A, is formed with a shorter overall length along the length direction of the cooling air flow path 84 than in the first exemplary embodiment, and is formed with a similar length to that in the second exemplary embodiment previously described. Thus, although the end portion on the cooling air entry port 86 side of the flow rectification section 94 is positioned further than the heat dissipation section 90 toward the cooling air entry port 86, the end portion on the cooling air discharge port 88 side of the flow rectification section 94 is at a position stopping short of (further toward the cooling air entry port 86 than) the end portion on the cooling air discharge port 88 side of the heat dissipation section 90.

Figure 14:
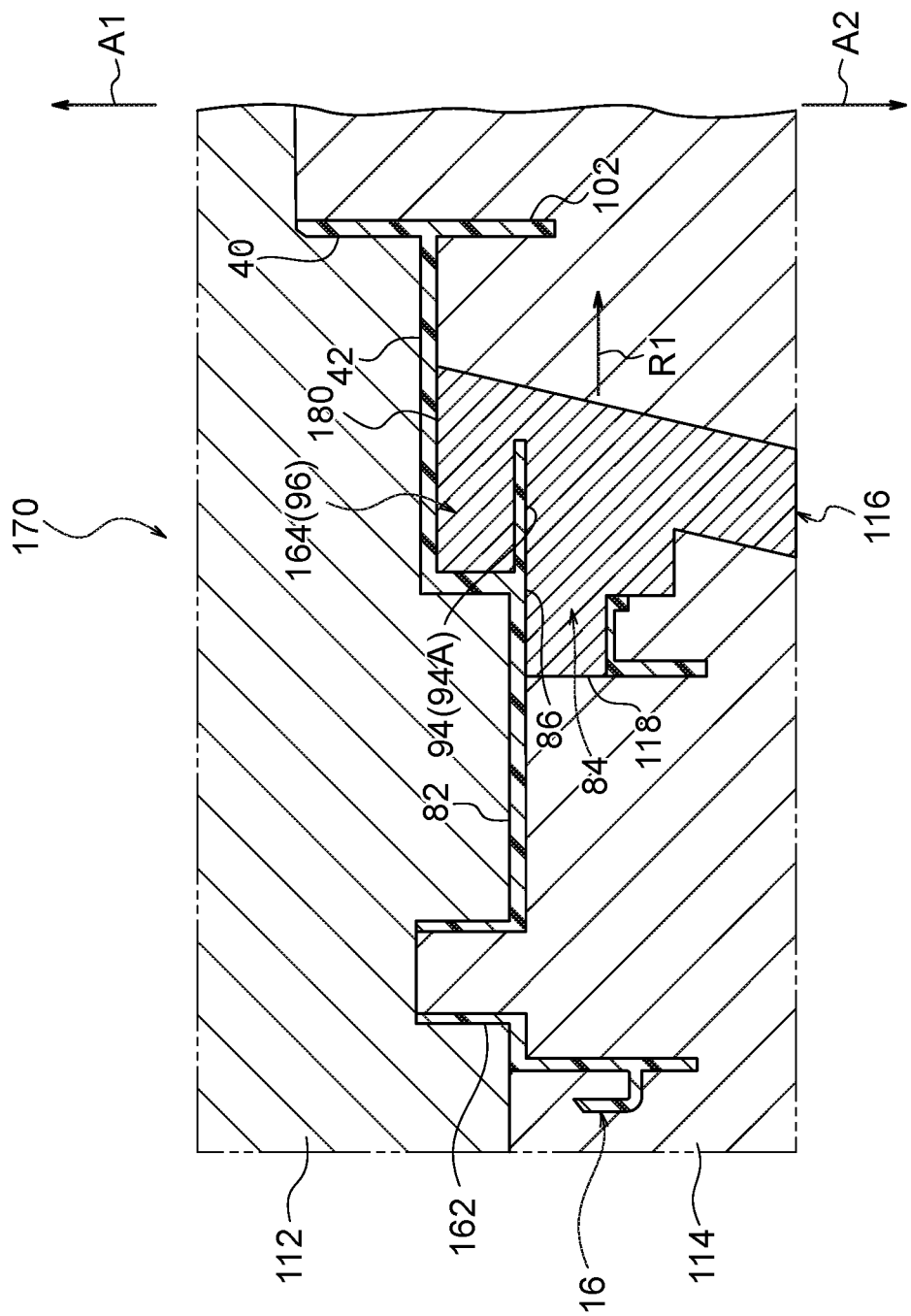
FIG. 14 is a vertical cross-section illustrating the motor holder illustrated in FIG. 12 being molded in a mold.

Note that the motor holder 16 including the above-described flow rectification section 94 and the upstand wall portion 102 is for example formed by molding from resin using a mold 170 illustrated in FIG. 14. In the mold 170, configuration of the sliding mold 116 is altered with respect to the first exemplary embodiment described previously, such that the sliding mold 116 is formed with a mold portion 180 for forming the space 164 in addition to the mold portion 118 for forming the cooling air flow path 84.

In order to remove the motor holder 16 from the mold 170 after the motor holder 16 has been molded from resin using the mold 170, first, the movable mold 114, the sliding mold 116, and the motor holder 16 are moved toward the arrow A2 side with respect to the fixed mold 112. The motor holder 16 and the sliding mold 116 are then moved toward the arrow A1 side with respect to the movable mold 114, and the sliding mold 116 is moved toward the radial direction inside of the motor holder 16 (the arrow R1 side) until the mold portion 180 has come out of the space 164. After the mold portion 180 has come out of the space 164, the motor holder 16 is then lifted using a non-illustrated ejector pin, such that the motor holder 16 is completely freed from the sliding mold 116. The motor holder 16 is thereby removed from the mold 170.

Note that since the space 164 formed to reduce the bulk of the flow rectification section 94 is formed between the flange section 42 and the cooling air flow rectification face 94A, the space 164 is open toward the radial direction inside of the motor holder 16. The opening in the space 164 opposes the upstand wall portion 102. Thus, the length of the space 164 affects the slide amount of the sliding mold 116 as it slides along the radial direction of the motor holder 16.

Namely, the slide amount of the sliding mold 116 as it slides along the radial direction of the motor holder 16 is set to the length at which the mold portion 170 comes out from the space 164. Thus, the flow rectification section 94, including the cooling air flow rectification face 94A, is formed with a shorter overall length along the length direction of the cooling air flow path 84 than in the first exemplary embodiment.

Explanation follows regarding operation and advantageous effects of the third exemplary embodiment of the present disclosure where they differ from those in the first exemplary embodiment previously described.

As illustrated in FIG. 12, in the motor 160 according to the third exemplary embodiment, the bulk reduction section 96 includes the space 164 formed between the flange section 42 and the cooling air flow rectification face 94A. The bulk reduction amount of the flow rectification section 94 is thereby secured by the space 164, enabling the volume of the flow rectification section 94 to be even more effectively reduced, and thereby enabling the occurrence of sink marks in the flow rectification section 94 to be still more effectively suppressed.

Further, due to this space 164, the flow rectification section 94 is formed in a plate shape extending along the cooling air flow path 84, thereby enabling the structure of the flow rectification section 94 to be simplified.

Next, explanation follows regarding modified examples of the third exemplary embodiment of the present disclosure.

Although the space 164 is open toward the radial direction inside of the motor holder 16 in the third exemplary embodiment, the space 164 may be open toward the radial direction outside of the motor holder 16. In such cases, the overall length of the flow rectification section 94, including the cooling air flow rectification face 94A, may be formed longer than that of the heat dissipation section 90 along the length direction of the cooling air flow path 84.

Moreover, although the bulk reduction section 96 includes the space 164 in the third exemplary embodiment, the bulk reduction section 96 may include at least one configuration out of the plural dimples 74A or the grooves 98 (see FIG. 3) of the first exemplary embodiment previously described in addition to the space 164.

Note that not only the configurations described in the first to third exemplary embodiments, but any other configuration may also be applied to the bulk reduction section 96, as long as the bulk reduction section 96 is formed between the cooling air flow rectification face 94A and the face 42A of the flange section 42 at the opposite side from the plate-shaped section 44, takes the form of a space with its height direction along the plate thickness direction of the flange section 42, and is formed at a position overlapping with the flow rectification section 94 as viewed along the plate thickness direction of the flange section 42. Note that the bulk reduction section 96 is formed during molding of the motor holder 16, and not by removing material after the motor holder 16 has been molded.

Although the first to third exemplary embodiments of the present disclosure have been described above, the present disclosure is not limited to the above description, and obviously various other modifications may be implemented within a range not departing from the spirit of the present disclosure.

The entire content of the disclosure of Japanese Patent Application No. 2017-148506 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A motor, comprising:
    a ring-shaped stator;
    a rotor that includes a roofed circular-tube-shaped rotor housing configured to house the stator;
    a motor holder that is formed in an annular plate shape with a plate thickness direction along an axial direction of the rotor housing, the motor holder including a flange section disposed such that the rotor housing is rotatable at an inner side of the flange section;
    a center piece that includes a plate-shaped section opposing the flange section, and that is configured to support the motor holder and the stator;
    a cooling air flow path that is formed between the flange section and the plate-shaped section so as to extend along a radial direction of the flange section, and that includes a cooling air entry port at an outer peripheral side of the flange section and a cooling air discharge port at an inner peripheral side of the flange section;
    a heat sink that includes a heat dissipation section projecting from the plate-shaped section toward the flange section so as to be disposed in the cooling air flow path;
    a flow rectification section that includes a cooling air flow rectification face extending along the cooling air flow path so as to oppose a top of the heat dissipation section at a close distance, and that is integrally formed with the flange section; and
    a bulk reduction section that is formed between the cooling air flow rectification face and a face of the flange section at an opposite side from the plate-shaped section,
    wherein the bulk reduction section includes a groove that opens onto the cooling air flow rectification face and extends along the cooling air flow path.

2. The motor of claim 1, further comprising an upstanding wall portion that projects perpendicularly from the flange section toward the plate-shaped section so as to form the cooling air discharge port between the upstanding wall portion and the plate-shaped section.

3. The motor of claim 1, wherein
    the flow rectification section protrudes from the flange section toward the heat dissipation section.

4. The motor of claim 1, wherein:
    the flow rectification section protrudes from the flange section toward the heat dissipation section; and
    the bulk reduction section includes a cavity formed in an inner portion of the flow rectification section.

5. The motor of claim 1, wherein the bulk reduction section includes a space that is formed between the flange section and the cooling air flow rectification face such that the flow rectification section is formed in a plate shape extending along the cooling air flow path.

6. The motor of claim 1, wherein:
    the flange section is formed with a plurality of dimples that are arrayed in a circumferential direction and in the radial direction of the flange section, and that each open onto the face of the flange section at the opposite side from the plate-shaped section; and
    of the plurality of dimples, the bulk reduction section includes a dimple formed at a position overlapping with the flow rectification section as viewed along a plate thickness direction of the flange section.

* * * * *